United States Patent
Toy

(10) Patent No.: US 11,206,195 B2
(45) Date of Patent: Dec. 21, 2021

(54) CLOUD COMPUTING ENVIRONMENT WITH SPLIT CONNECTIVITY AND APPLICATION INTERFACES THAT ENABLE SUPPORT OF SEPARATE CLOUD SERVICES

(71) Applicant: Verizon Patent and Licensing Inc., Arlington, VA (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 22 days.

(21) Appl. No.: 16/593,486

(22) Filed: Oct. 4, 2019

(65) Prior Publication Data

US 2021/0105194 A1 Apr. 8, 2021

(51) Int. Cl.
*H04L 12/24* (2006.01)
*H04L 29/08* (2006.01)

(52) U.S. Cl.
CPC .......... *H04L 41/5051* (2013.01); *H04L 67/10* (2013.01)

(58) Field of Classification Search
CPC .................. H04L 41/5051; H04L 67/10
See application file for complete search history.

(56) References Cited

U.S. PATENT DOCUMENTS

| 10,117,285 B2* | 10/2018 | Nadella | H04W 76/12 |
| 10,193,864 B2* | 1/2019 | Toy | H04L 67/1097 |
| 2016/0088068 A1* | 3/2016 | Toy | H04L 63/0272 709/219 |
| 2018/0159745 A1* | 6/2018 | Byers | H04L 43/08 |
| 2019/0253481 A1* | 8/2019 | Chiu | H04L 67/10 |
| 2019/0364096 A1* | 11/2019 | Li | G06F 9/5055 |
| 2019/0372888 A1* | 12/2019 | Michael | H04L 45/586 |
| 2020/0145299 A1* | 5/2020 | Do | H04L 41/082 |
| 2021/0014256 A1* | 1/2021 | Malhotra | G06F 21/554 |

OTHER PUBLICATIONS

The Cloud Ethernet Forum, "Technical Specification OCC 1.0", Dec. 2014, 104 pages.

\* cited by examiner

*Primary Examiner* — William G Trost, IV
*Assistant Examiner* — Monishwar Mohan

(57) ABSTRACT

A cloud service provider network may receive, from a cloud subscriber device, a request to access an application, wherein the cloud service provider network includes a split interface associated with the cloud subscriber device. The cloud service provider network may provide, to the cloud operator device, the request to access the application, wherein the cloud operator device stores the application. The cloud service provider network may receive, from the cloud operator device, the application, based on the request to access the application. The cloud service provider network may provide the application to the cloud subscriber device via the application interface of the split interface, wherein the connectivity interface connects the cloud subscriber device and the cloud operator device so that the application is provided to the cloud subscriber device via the application interface.

20 Claims, 18 Drawing Sheets

CLOUD COMPUTING ENVIRONMENT WITH SPLIT CONNECTIVITY AND APPLICATION INTERFACES THAT ENABLE SUPPORT OF SEPARATE CLOUD SERVICES

BACKGROUND

In recent years, types of user devices that utilize cloud-based services have grown rapidly with little standardization. Users of the user devices prefer services that are on-demand, scalable, highly available, secure, utilize usage-based billing, and/or the like. In order to meet these preferences, cloud connectivity providers and cloud application providers need to be able to quickly create the services and utilize resources effectively.

DETAILED DESCRIPTION OF PREFERRED EMBODIMENTS

The following detailed description of example implementations refers to the accompanying drawings. The same reference numbers in different drawings may identify the same or similar elements.

Cloud connectivity providers and cloud application providers are often unable to efficiently provide services to users due to current cloud architectural constraints. This results in waste of computing resources (e.g., processing resources, memory resources, communication resources, and/or the like), networking resources, and/or the like in providing cloud services to user devices associated with the users.

Some implementations described herein provide a cloud computing, storage, and networking environment (referred to herein as "cloud computing environment") with split connectivity and application interfaces that enable support of separate cloud services. For example, the cloud computing environment may include a cloud service provider network that may receive, from a cloud subscriber device, a request to access an application. The cloud service provider network may include a split interface associated with the cloud subscriber device. The split interface may include a connectivity interface associated with a connectivity operator device, and an application interface associated with a cloud operator device. The cloud service provider network may provide, to the cloud operator device, the request to access the application, wherein the cloud operator device stores the application, and may receive, from the cloud operator device, the application based on the request to access the application. The cloud service provider network may provide the application to the cloud subscriber device via the application interface of the split interface. The connectivity interface connects the cloud subscriber device and the cloud operator device so that the application is provided to the cloud subscriber device via the application interface.

In this way, the cloud computing environment with the split connectivity and application interfaces enables cloud services to be more efficiently provided to users. Thus, the cloud computing environment conserves computing resources (e.g., processing resources, memory resources, communication resources, and/or the like), networking resources, and/or the like that would otherwise be wasted attempting to provide the cloud services without the split connectivity and application interfaces.

Figure 1A:
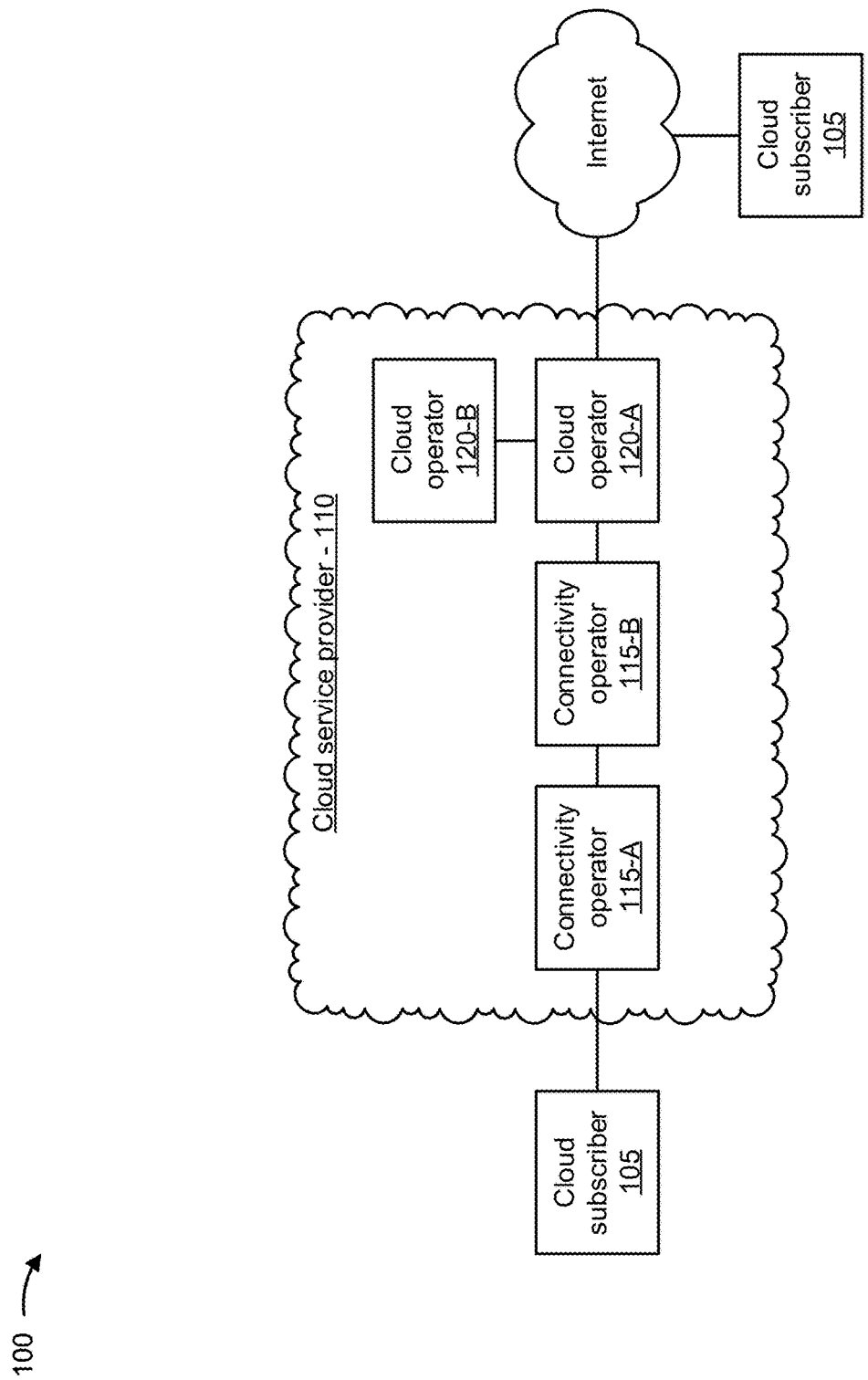
FIGS. 1A-1O are diagrams of one or more example implementations described herein.

FIGS. 1A-1O are diagrams of one or more example implementations 100 described herein. As shown in FIG. 1A, a cloud subscriber 105 may be associated with a cloud service provider network 110. Cloud service provider network 110 may include a cloud computing environment with computing resources that perform functionality associated with connectivity operators 115-A and 115-B (e.g., also referred to as connectivity operator 115), cloud operators 120-A and 120-B (e.g., also referred to as cloud operator 120), and/or the like. Cloud service provider network 110 may provide cloud services to cloud subscribers 105. The cloud services may include computing resources, storage resources, applications, connectivity among the aforementioned, and/or the like, that may be accessed by cloud subscribers 105 from one or more locations. Cloud subscriber 105 may include an end-user that maintains a business relationship with and utilizes services from cloud service provider network 110. Connectivity operator 115 may provide connectivity services between cloud operators 120, connectivity operators 115, cloud subscribers 105, and/or the like. Cloud operator 120 may make cloud applications available to cloud subscribers 105. A cloud service provider (e.g., associated with cloud service provider network 110) may be responsible for creation, delivery, and billing of cloud services; negotiating relationships among cloud subscribers 105, connectivity operators 115, and cloud operators 120; and providing a single point of contact for cloud subscribers 105.

In some implementations, for a particular cloud service, cloud subscriber 105 may contract with cloud service provider network 110 to be responsible for delivering the particular cloud service at locations associated with cloud subscriber 105. Cloud service provider network 110, in turn, may select and contract with various connectivity operators 115 and cloud operators 120 to deliver the particular cloud service to the locations. Cloud service provider network 110 may ensure that the particular cloud service purchased by cloud subscriber 105 is delivered. Various types of entities may act as a cloud service provider, such as a system integrator, a mobile operator, an Internet service provider (ISP), a cloud operator, a cloud subscriber, and/or the like.

In some implementations, the cloud services may include connectivity and application functionalities with operational flexibility in service order, provisioning, monitoring, billing, and/or the like. In cloud services, networking, compute, storage, and applications may be treated together as a single service provided to cloud subscriber 105. Capabilities provided by virtual network functions (VNFs) and network function virtualization infrastructure (NFVI) may be utilized by cloud services. For operational flexibility, virtualized components may be utilized by cloud subscriber 105. For example, a cloud security service via a virtual firewall can be provided at subscriber premises, in a data center in a core network, or anywhere in between, based on a subscriber request.

In some implementations, a cloud service may combine connectivity and applications with compute, storage, and networking resources; may include virtualized components (e.g., VNFs) and non-virtualized components (e.g. physical network functions (PNFs)) that may or may not be exposed to cloud subscriber 105; may include network functions with only non-virtualized components or both virtualized components and non-virtualized components that may not be fully exposed to cloud subscriber 105; may include applications built with virtualized components that may not be fully exposed to cloud subscriber 105; may include connections provided by one or more cloud operators 120 and/or network operators (e.g., connectivity operators 115); may support on-demand service configurations by cloud subscribers 105 and locations of service functionality; may support service monitoring and usage-tracking by cloud subscribers 105; may support self-service by cloud subscribers 105 and collaboration among connectivity operators 115 and cloud operators 120 in providing resources; may support scalability of resources on-demand; may support various high-availability options from a physical layer to an application layer; may support usage-based billing; and/or the like.

In some implementations, an interface may be provided between cloud subscriber 105 and cloud service provider network 110 and may be referred to as a cloud subscriber interface. The cloud subscriber interface may enable cloud subscriber 105 to connect to and operate over cloud platforms, connect and execute applications provided by cloud service provider network 110, and/or the like. An interface may be provided between cloud subscriber 105 and an application, between cloud applications, between cloud operators 120, and/or the like. A connection may be provided between cloud subscriber 105 and an application, between and/or among cloud subscribers 105, between and/or among cloud applications, and/or the like.

Cloud subscriber 105 may interface with cloud service provider network 110 via a network (e.g., the Internet) and the cloud subscriber interface. The cloud subscriber interface may include a connectivity interface associated with a connectivity operator device (e.g., connectivity operator 115) and an application interface associated with a cloud operator device (e.g., cloud operator 120). For example, as shown to the left in FIG. 1B, the cloud subscriber interface may include a connectivity interface that includes a cloud connectivity user-to-network interface (UNI) 125 and an application interface that includes cloud application UNIs 130. In some implementations, cloud subscriber 105 may access cloud service provider network 110 via a private network and the connectivity interface. Additionally, or alternatively, cloud subscriber 105 may access cloud service provider network 110 via a public network and the connectivity interface. In some implementations, connectivity operator 115 may connect with cloud operator 120 and may enable connectivity of cloud subscriber device 105 to cloud operator device 120.

Figure 1B:
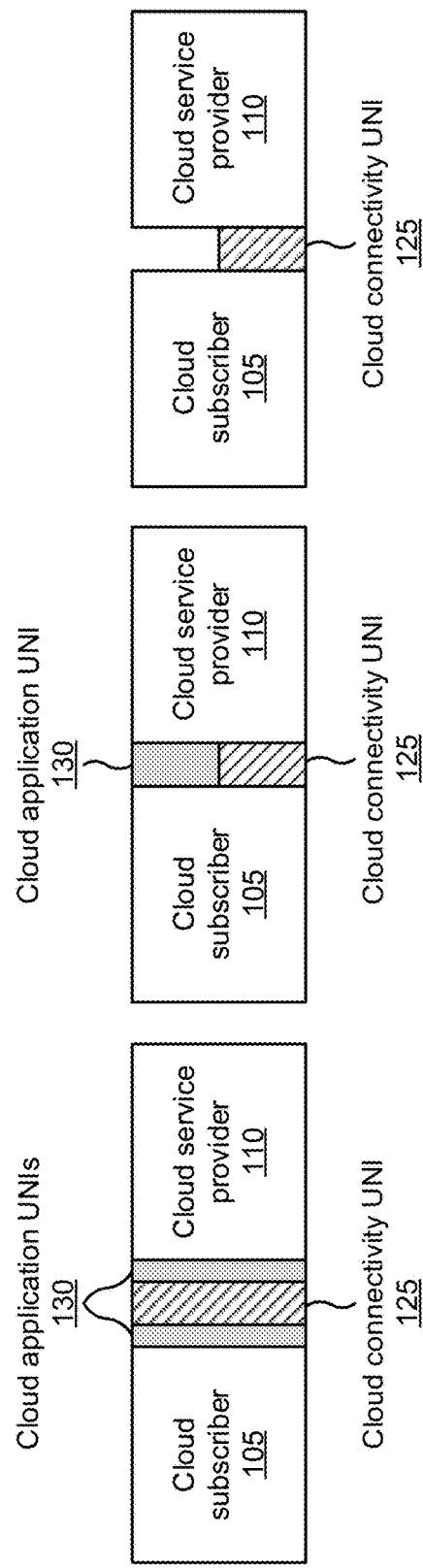

In some implementations, cloud service provider network 110 may include a split interface associated with cloud subscriber 105. For example, as shown in the middle of FIG. 1B, the cloud subscriber interface may be split between cloud connectivity UNI 125 and cloud application UNI 130. In this way, the cloud subscriber interface enables separate capabilities (e.g., connectivity and applications) to be supported by separate cloud provider entities (e.g., connectivity operators 115 and cloud operators 120), and allows cloud application UNIs 130 to be deployed at network edge devices as well as in internal network devices. For example, a connectivity operator 115 may provide connectivity services through cloud connectivity UNI 125, and an application may tunnel through to a cloud operator 120 that provides the application. Another example may include function chaining, where functions may be distributed across multiple cloud operators 120 and connected to each other through cloud application UNIs 130 (e.g., a VNF in a first carrier core network that connects to a VNF in a second carrier core network, that may also connect to a VNF in an enterprise network serviced by the first or second carrier core networks). The cloud subscriber interface also enables providing cloud connectivity UNI 125 at network gateways, while placing cloud application UNI 130 at internal network nodes or virtualized nodes.

In some implementations, cloud service provider network 110 may receive, from cloud subscriber 105, a request to access an application (e.g., packets requesting access to the application), may route the request to access the application to a cloud operator device (e.g., cloud operator 120) that stores the application, and may receive the application (e.g., application packet data units (PDUs)) from the cloud operator device based on the request. In this case, cloud service provider network 110 may provide the application to cloud subscriber 105 via the application interface of the split interface, and the connectivity interface may connect cloud subscriber 105 and cloud operator 120 so that the application is provided to cloud subscriber 105 via the application interface.

Figure 1C:
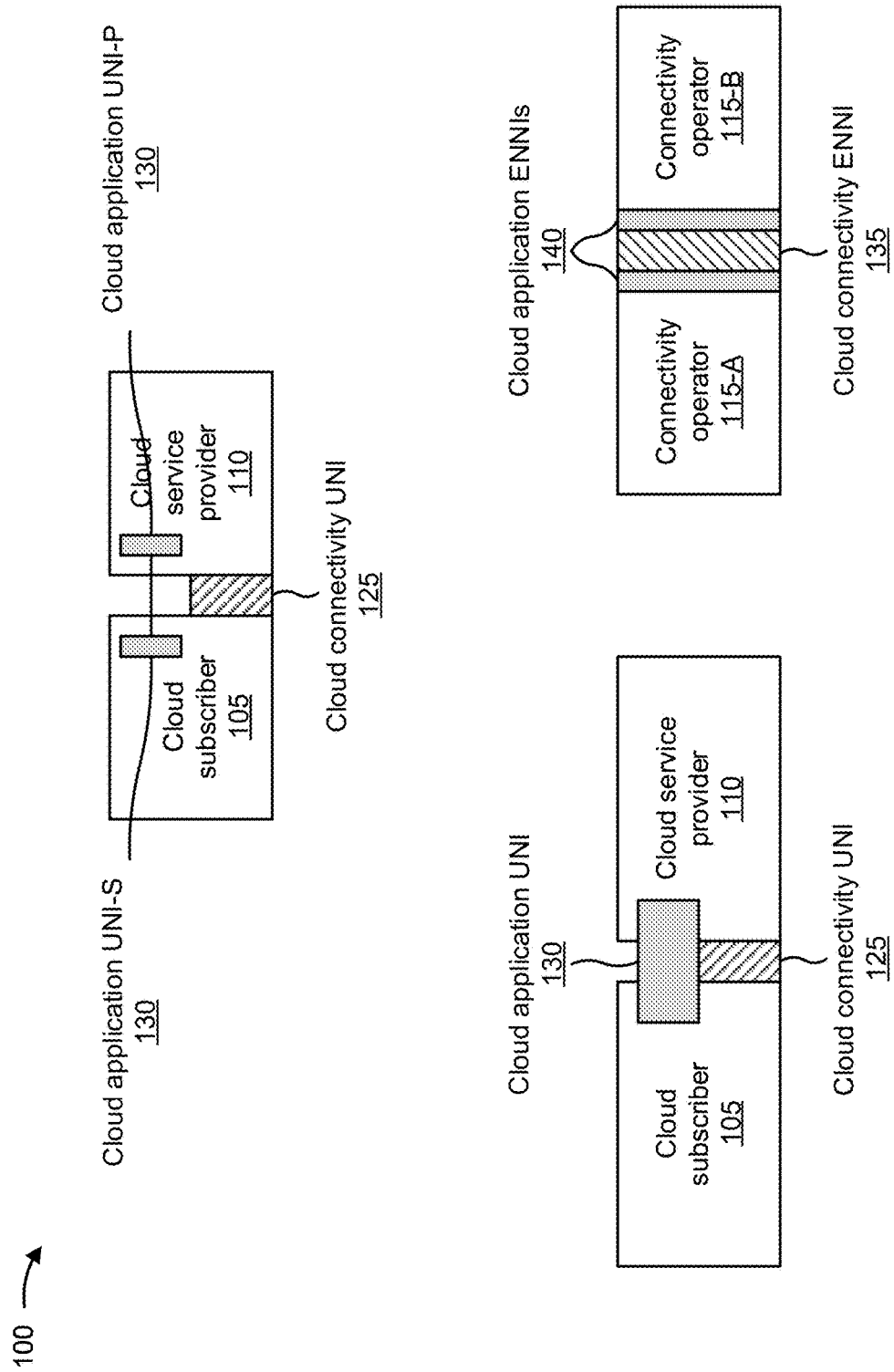

As shown to the right in FIG. 1B, the cloud subscriber interface may include only cloud connectivity UNI 125 and may omit cloud application UNI 130 when only connectivity services are offered at the cloud subscriber interface. As shown to the left in FIG. 1C, the cloud subscriber interface may include cloud connectivity UNI 125, and cloud application UNI 130 may be located both within cloud subscriber 105 and within cloud service provider network 110. Cloud connectivity UNI 125 of the cloud subscriber interface may be provided at a location where physical connectivity occurs between cloud subscriber 105 and cloud service provider network 110. Cloud application UNI 130 may be provided between cloud subscriber 105 applications and cloud service provider network 110 applications.

The cloud subscriber interface may demarcate domains managed by cloud service provider network 110 and domains managed by cloud subscriber 105. The cloud subscriber interface may be implemented over a bi-directional link that provides various traffic, control plane, and management capabilities required by cloud service provider network 110 and dedicated to a single cloud subscriber 105, such as an enterprise. Multiple traffic flows can be multiplexed over the cloud subscriber interface using logical connections.

Across the cloud subscriber interface, cloud subscriber 105 may establish a connection (e.g., a cloud virtual connection (VC)) with resources of cloud service provider network 110, such as virtual machines (VMs) and applications (e.g., VNFs), and/or the like. Cloud subscriber 105 and cloud service provider network 110 may exchange cloud service packets across the cloud subscriber interface. A cloud service packet may include a Layer 1 (L1) frame, an Ethernet frame, an Internet protocol (IP) packet, a multi-protocol label switching (MPLS) packet, an application protocol data unit (PDU), and/or the like. A cloud service packet transmitted across the cloud subscriber interface toward cloud service provider network 110 may be referred to as an ingress cloud service packet, and a cloud service packet transmitted across the cloud subscriber interface toward cloud subscriber 105 may be referred to as an egress cloud service packet.

In some implementations, the cloud subscriber interface may support Layer 1 (L1 or physical layer), Layer 2 (L2 or data link layer), Layer 3 (L3 or network layer), Layer 4 (L4 or transport layer), Layer 5 (L5 or session layer), Layer 6 (L6 or presentation layer), and Layer 7 (L7 or application layer) protocols in the data plane, the control plane, and/or the management plane. Cloud connectivity UNI 125 may support the L1 through L3 protocols in the data plane, the control plane, and/or the management plane, and cloud application UNI 130 may support the L2 through L7 protocols in the data plane, the control plane, and/or the management plane.

Applications and connectivity to the applications may be provided by one or more connectivity operators 115 and cloud operators 120 that are subcontracted by the cloud service provider for providing a cloud service to cloud subscriber 105. For example, a cloud service provider can implement the cloud service for cloud subscriber 105 by subcontracting with one or more operators. Each operator may provide a connectivity service (e.g., connectivity operator 115) or a cloud service (e.g., cloud operator 120). Two connectivity operators 115-A and 115-B may interface with each other via a cloud operator-operator interface, as shown to the right in FIG. 1C. As shown at the top in FIG. 1C, cloud subscriber 105 and cloud service provider 110 may interface via cloud connectivity UNI 125. Application UNI can be represented as UNI-S and UNI-P that are separately administered functional components of Application UNI. A cloud application UNI-S 130 may be located within cloud subscriber 105, and a cloud application UNI-P 130 may be located within cloud service provider 110. Cloud connectivity UNI 125 may be provided at a location where physical connectivity occurs between cloud subscriber 105 and cloud service provider 110.

Figure 1D:
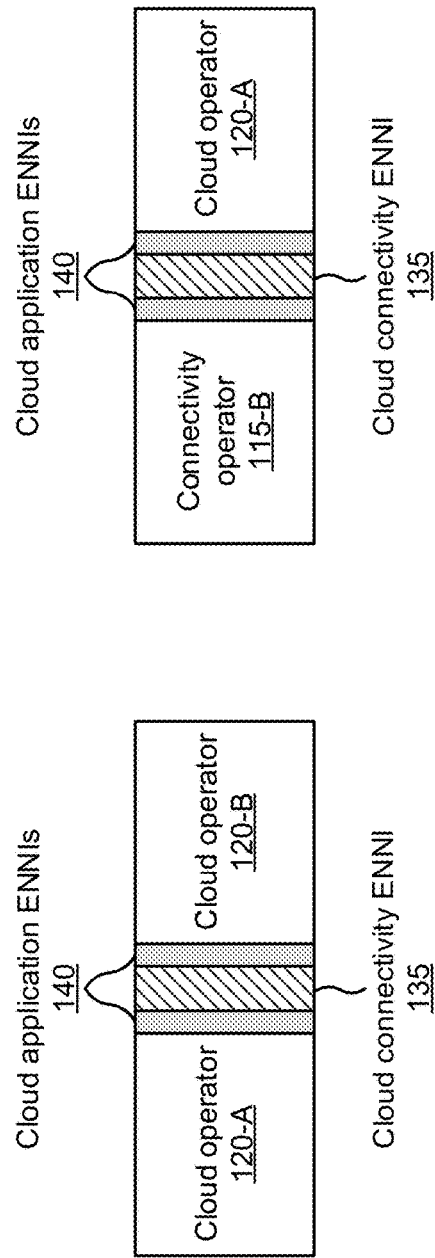

The cloud operator-operator interface may include a cloud connectivity external network-to-network interface (ENNI) 135 and cloud application ENNIs 140. Two cloud operators 120-A and 120-B may interface with each other via a cloud operator-operator interface, as shown to the left in FIG. 1D. The cloud operator-operator interface may include a cloud connectivity ENNI 135 and cloud application ENNIs 140. Cloud connectivity operator 115-B and cloud operator 120-A may interface with each other via a cloud operator-operator interface, as shown to the right in FIG. 1D. The cloud operator-operator interface may include a cloud connectivity ENNI 135 and cloud application ENNIs 140.

Figure 1E:
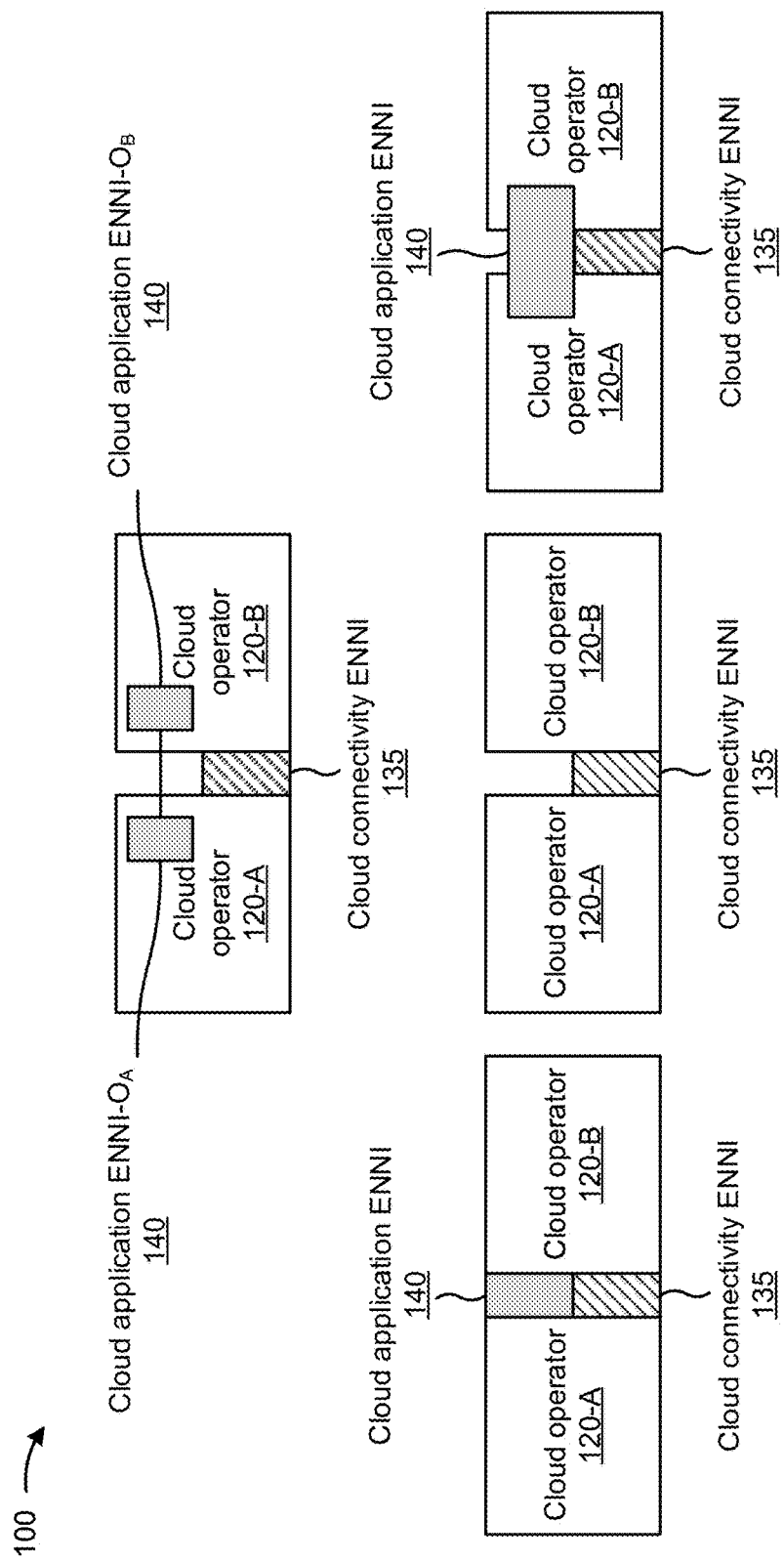

As shown to the left in FIG. 1E, the cloud operator-operator interface may be split between cloud connectivity ENNI 135 and cloud application ENNI 140. In this way, the cloud operator-operator interface enables separate capabilities (e.g., connectivity and applications) to be supported by separate cloud provider entities (e.g., connectivity operators 115 and cloud operators 120). As shown in the middle in FIG. 1E, the cloud operator-operator interface may include only cloud connectivity ENNI 135, and may omit cloud application ENNI 140, when only connectivity services are offered at the cloud operator-operator interface. As shown to the right in FIG. 1E, the cloud operator-operator interface may include cloud connectivity ENNI 135, and cloud application ENNI 140 may be located within cloud operator 120-A and within cloud operator 120-B. Cloud connectivity ENNI 125 of the cloud operator-operator interface may be provided at a location where physical connectivity occurs between cloud operator 120-A and within cloud operator 120-B. Cloud application ENNI 140 may be provided between cloud operator 120-A and cloud operator 120-B applications. As shown at the top in FIG. 1E, the cloud operator-operator interface may include cloud connectivity ENNI 135, cloud application ENNI-OA 140 may be located within and administered by cloud operator 120-A, and cloud application ENNI-OB 140 may be located within and administered by cloud operator 120-B. Cloud connectivity ENNI 135 of the cloud operator-operator interface may be provided at a location where physical connectivity occurs between cloud operator 120-A and cloud operator 120-B.

The cloud operator-operator interface may demarcate domains under the responsibility of each operator 120 for cloud services. In some implementations, the cloud operator-operator interface may support the L1 through L7 protocols in the data plane, the control plane, and/or the management plane. Cloud connectivity ENNI 135 may support the L1 through L3 protocols in the data plane, the control plane, and/or the management plane, and cloud application ENNI 140 may support the L2 through L7 protocols in the data plane, the control plane, and/or the management plane.

Figure 1F:
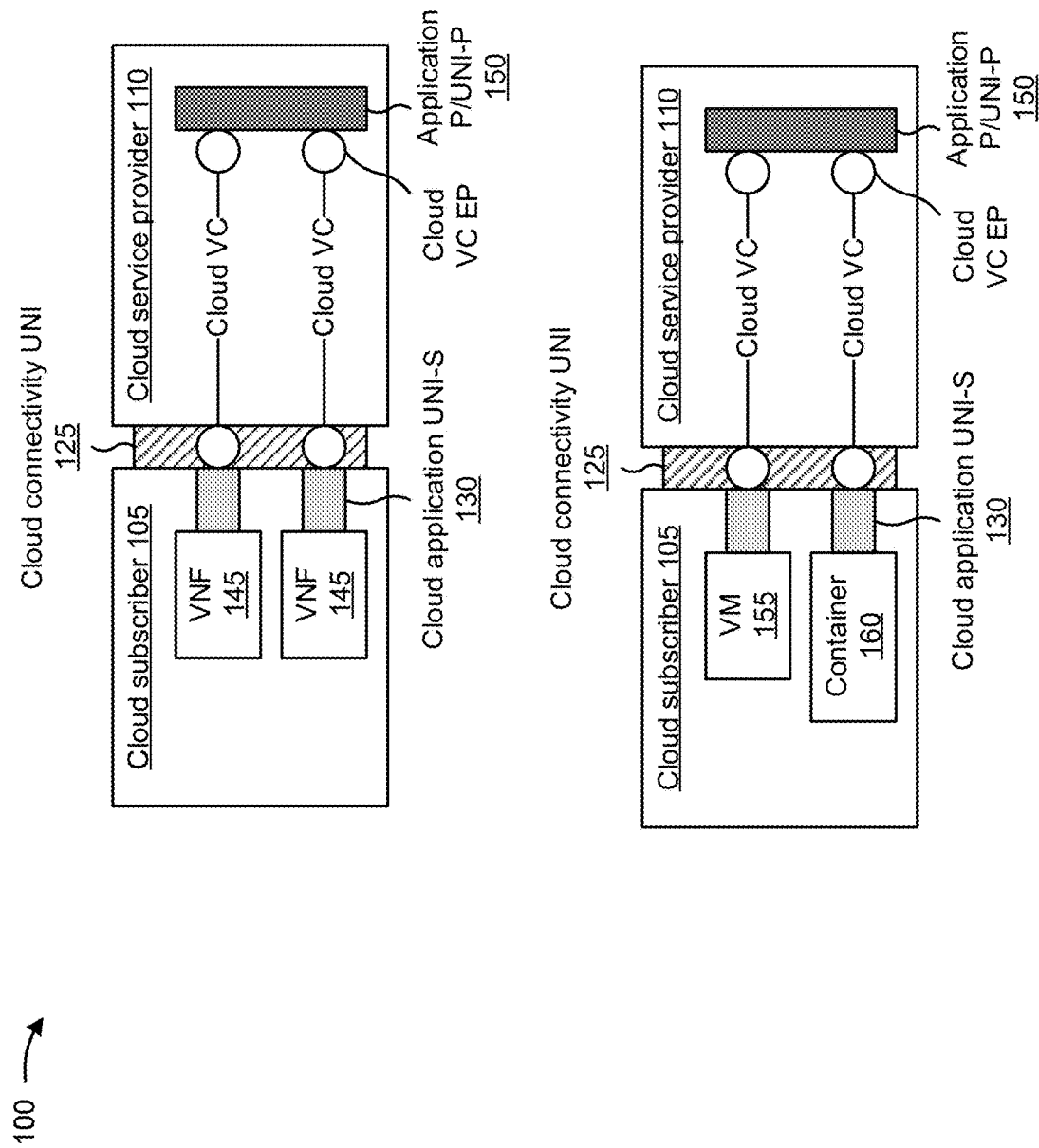

A cloud application interface (e.g., cloud application UNI-S 130) may include an interface of a cloud service application or a cloud service platform supported by cloud operator 120 or cloud service provider network 110. Therefore, the cloud application interface may be an interface of a VNF, a VM, a container, and/or the like, as shown in FIG. 1F. As shown at the top of FIG. 1F, the cloud application interface may connect VNFs 145 provided by cloud subscriber 105 with a cloud connectivity interface (e.g., cloud connectivity UNI 125) via cloud virtual connection (VC) end points (EPs). The cloud VC EPs may connect, via cloud VCs, with other cloud VC EPs associated with an application P (Provider) or UNI-P 150 provided by cloud service provider network 110. In one example, VNF 145 may be a firewall as part of security-as-a-service (SECaaS), a software-defined wide area network (SD-WAN) edge as part of a SD-WAN service, and/or the like.

As shown at the bottom of FIG. 1F, the cloud application interface may connect a VM 155 and a container 160 provided by cloud subscriber 105 to the application provided by cloud service provider network 110 via a cloud VC with an EP on the application (e.g., with the cloud connectivity interface via cloud VC EPs). The cloud VC with EPs may connect with other cloud VC EPs associated with application P or UNI-P 150 provided by cloud service provider network 110. In one example, VM 155 and container 160 may be a part of a virtualization platform supporting a platform-as-a-service (PaaS). In some implementations, the cloud application interface may support the L2 through L7 protocols in the data plane, the control plane, and/or the management plane. For example, the cloud application interface may be an L2 interface for WAN optimization, an L3 interface for an SD-WAN and a virtual router, an L7 interface for multimedia applications, and/or the like.

Figure 1G:
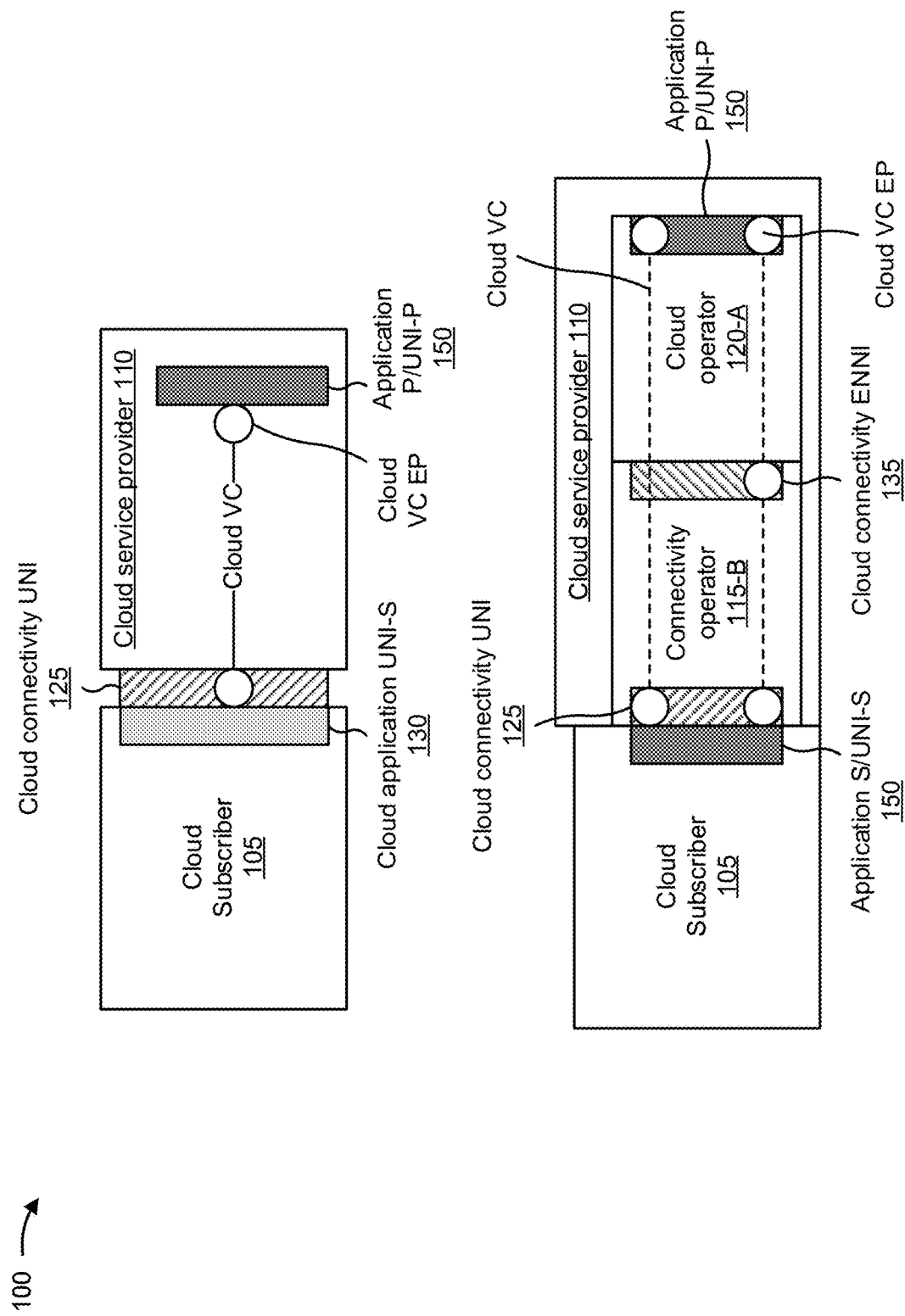

FIG. 1G depicts a connection and connection end points providing cloud services for a cloud VC crossing one or more administrative domains. When a cloud VC crosses multiple cloud operators 120, the cloud VC and cloud VC EPs in each cloud operator 120 may be referred to as an operator cloud VC and operator cloud VC EPs, respectively. As shown at the top of FIG. 1G, the cloud VC may be provided between two cloud VC EPs residing on resources of cloud service provider network 110. As shown at the bottom of FIG. 1G, the cloud VC may be provided between a cloud VC EP residing on resources of connectivity operator 115-B and another cloud VC EP residing on resources of cloud operator 120-A.

The cloud VC EP is a logical end point of a cloud VC, where the cloud VC terminates at application UNI-S 130 to which a particular subset of cloud service packets that traverse application UNI-S 130 is mapped. The particular subset of cloud service packets may be identified via various techniques, such as via application identifiers, source IP addresses, destination IP addresses, virtual local area network (VLAN) identifiers (IDs), and/or the like. Properties may be associated with the cloud VC EP, such as an identifier of application UNI-S 130, availability, bandwidth profile, parameters of security functionalities, administrative state, operational state, and/or the like.

The cloud VC may be associated with two or more cloud VC EPs. For example, the cloud VC may include an Ethernet VC (EVC), an IP VC, an SD-WAN VC, and/or the like. Properties may be associated with the cloud VC, such as identifiers of cloud VC EPs associated with the cloud VC, connection type, service level specification (SLS), redundancy, connection start time, connection duration, connection period, billing options, maximum size of PDUs transmitted over the cloud VC, administrative and operational states, and/or the like.

Figure 1H:
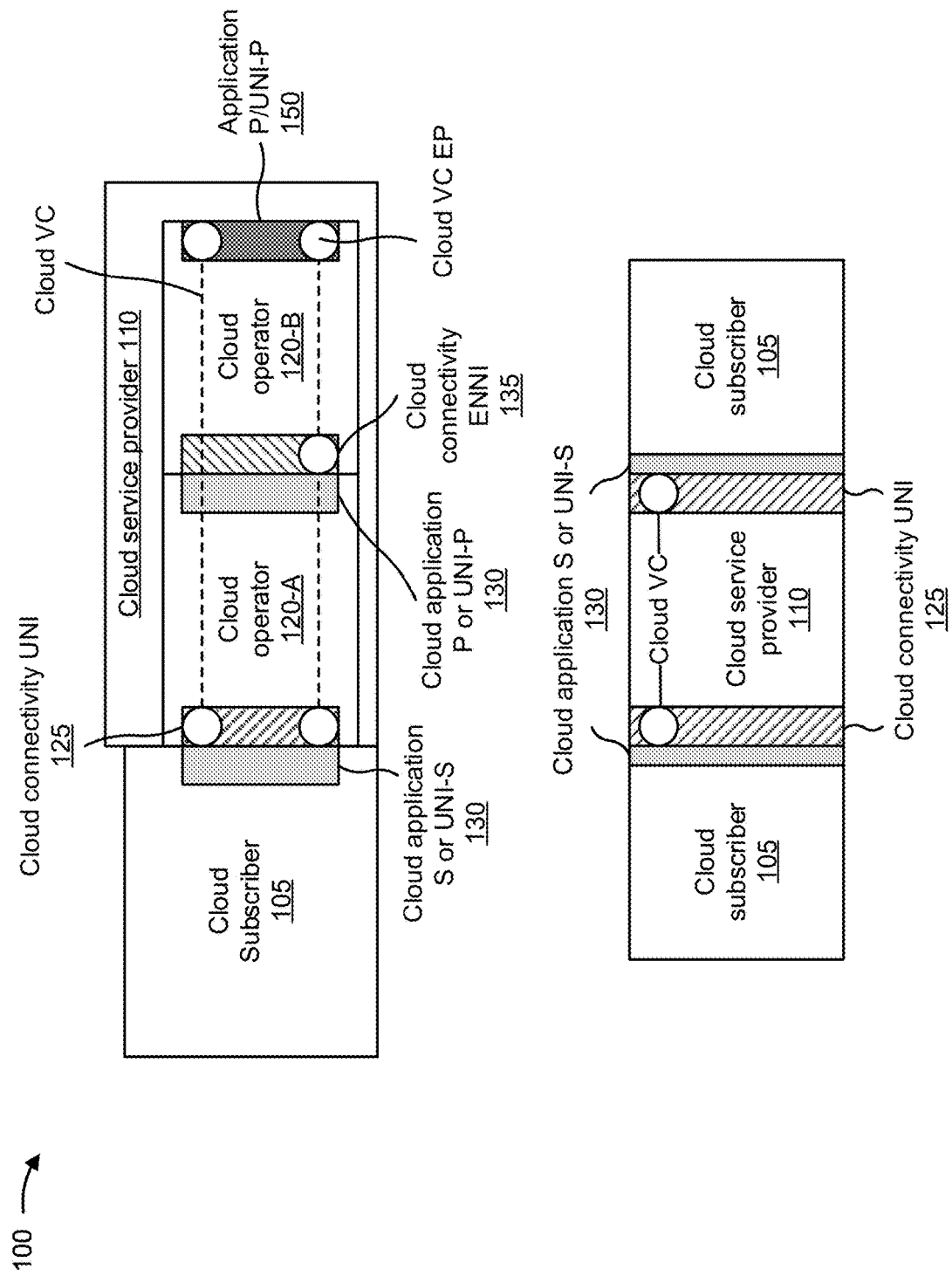

The cloud VC may cross multiple operator domains (e.g., cloud operators 120-A and 120-B), as shown at the top of FIG. 1H. Each of cloud operators 120-A and 120-B may include a component of the cloud VC, referred to as an operator cloud VC. An operator cloud VC may be another cloud VC, but may be referred to as an operator cloud VC to identify a connection, such as a component connection or an end-to-end connection. The operator cloud VC may be a cross connect between two cloud VC EPs, and may be similar to an operator VC of carrier Ethernet services, a link state protocol (LSP), an IP virtual private network (VPN) connection component, an SD-WAN connection, and/or the like. The properties of an operator cloud VC may be similar to those for a cloud VC.

Subscriber cloud services may be provided among two or more cloud subscribers 105, between cloud subscribers 105 and applications P/UNI-P 150 provided by cloud service provider network 110, between cloud subscribers 105 and applications of cloud subscribers 105, and/or the like. On the other hand, operator cloud services may be provided among two or more cloud operators 120 and connectivity operators 115, among applications of cloud operators 120, and/or the like.

Figure 1I:
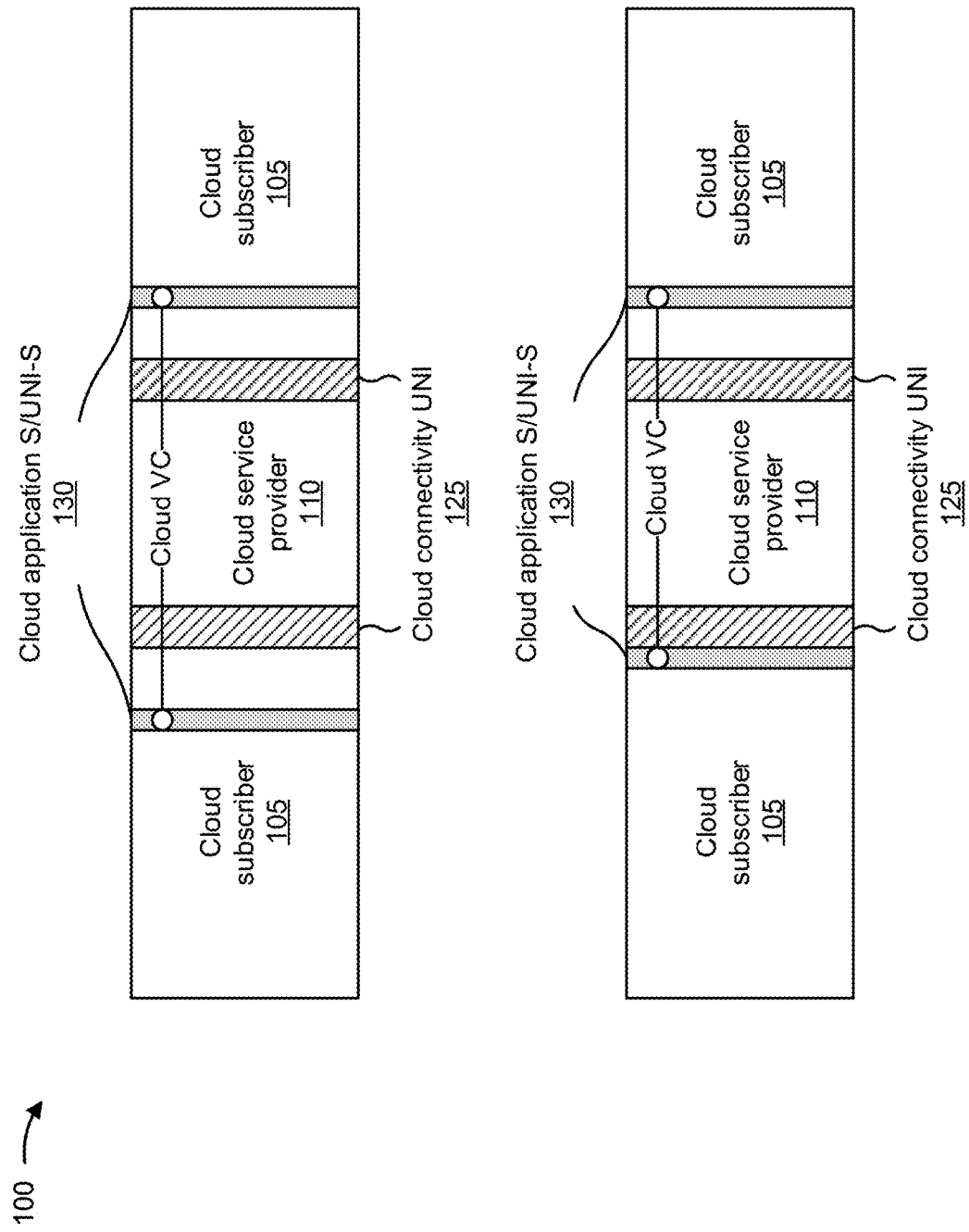

As shown at the bottom of FIG. 1H, a cloud VC provided among cloud subscribers 105 may terminate at cloud subscriber interfaces (e.g., cloud connectivity UNIs 125). As shown at the top of FIG. 1I, a cloud VC provided among cloud subscribers 105 may terminate at cloud application interfaces (e.g., cloud application S/UNI-Ss 130). As shown at the bottom of FIG. 1I, a cloud VC provided among cloud subscribers 105 may terminate at a cloud subscriber interface (e.g., cloud connectivity UNI 125) and a cloud application interface (e.g., cloud application S/UNI-S 130).

Figure 1J:
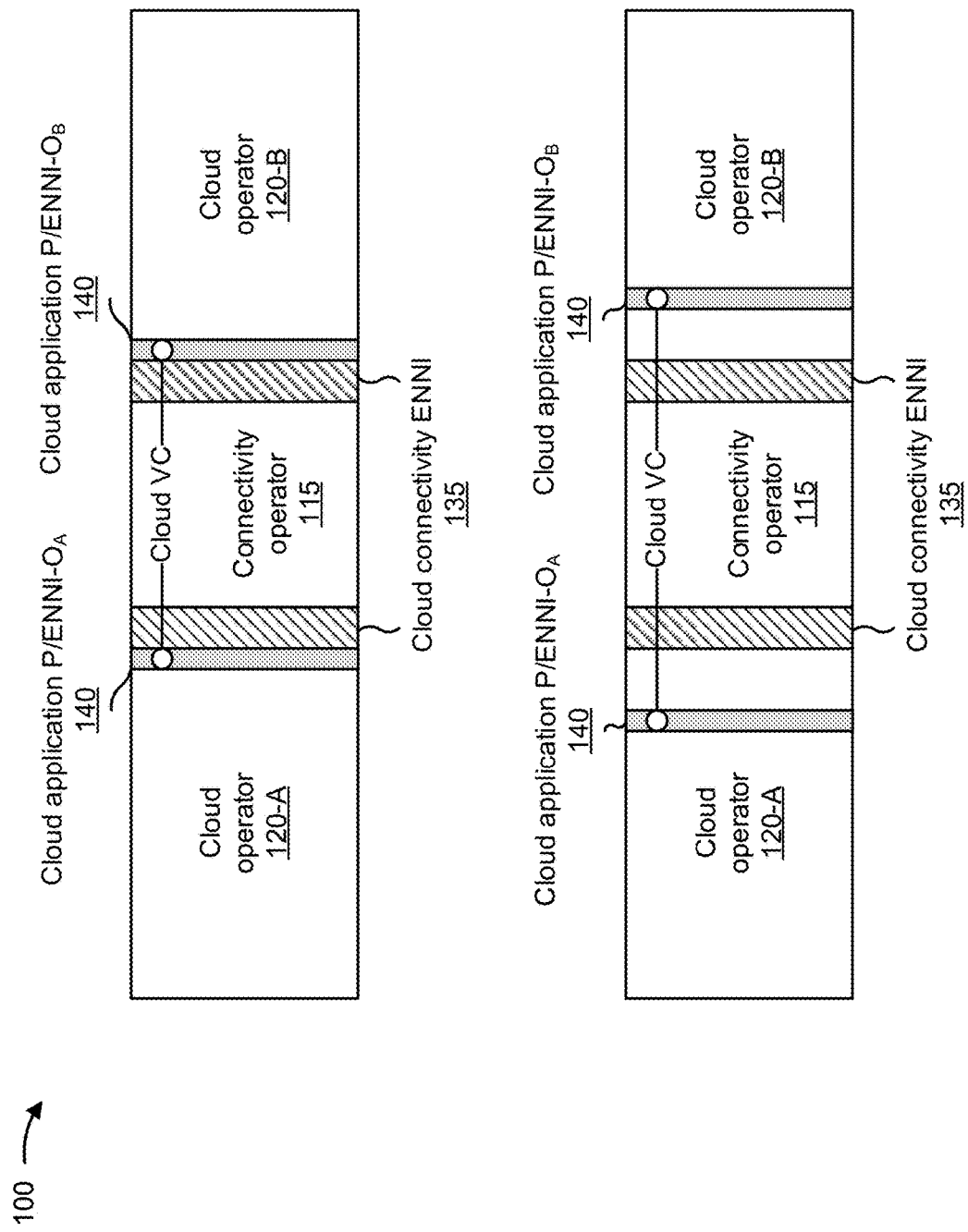

As shown at the top of FIG. 1J, a cloud VC provided among cloud operators 120 and/or connectivity operators 115 may terminate at cloud operator interfaces (e.g., cloud connectivity ENNIs 135) or cloud application interfaces (e.g., cloud application P/ENNI-OA or ENNI-OB 140). As shown at the bottom of FIG. 1J, any one of the cloud operators (e.g., cloud operators 120-A or 120B) may act as a cloud service provider. Remaining cloud operators may provide operator cloud services to the cloud operator acting as the cloud service provider. In some implementations, the cloud operators may jointly establish cloud connectivity ENNIs 135 from connectivity operator 115 for communications via a cloud VC. The cloud VC provided among cloud operators 120-A and 120-B may terminate at cloud application interfaces (e.g., cloud application P/ENNI-OA or ENNI-OB 140). For example, connectivity operator 115 may provide connectivity services (e.g., NaaS) to the cloud operator acting as the cloud service provider.

Figure 1K:
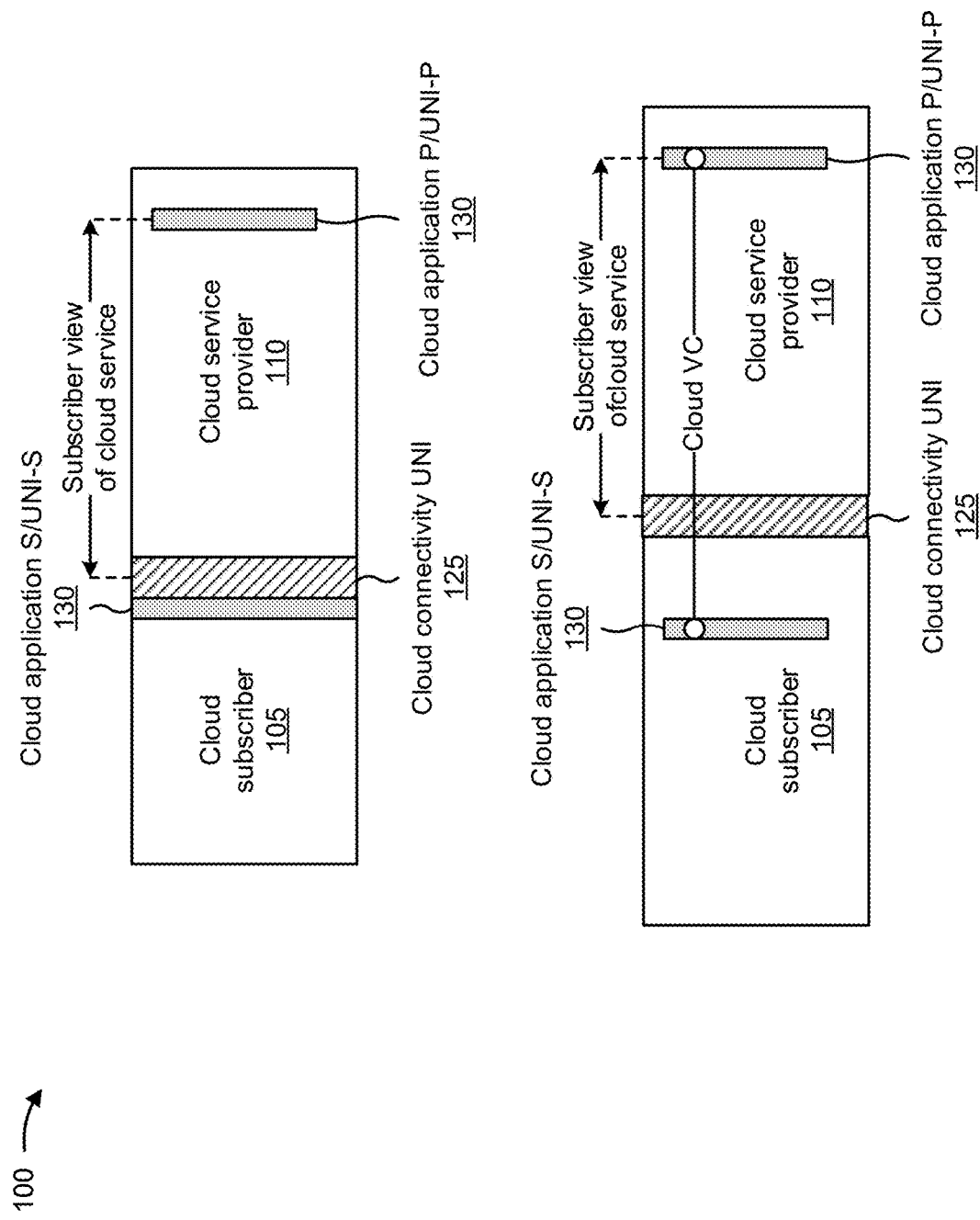

In some implementations, cloud subscribers 105 may be concerned about an end-to-end service and not about service implementation, while cloud service provider network 110 and cloud operators 120 may be concerned about the service implementation. In some implementations, cloud subscribers 105 may be interested in self-configuration and self-management of services. The top of FIG. 1K provides a general representation of subscriber views of cloud services provided by cloud service provider network 110 to cloud subscriber 105. As shown at the top of FIG. 1K, a cloud subscriber interface (e.g., cloud connectivity UNI 125) may be provided between cloud subscriber 105 and cloud service provider network 110 in order to connect a cloud service (e.g., cloud application S/UNI-S 130) with cloud subscriber 105. The bottom of FIG. 1K provides a case where cloud subscriber 105 accesses cloud service provider network 110 via a private network and cloud application S/UNI-S 130 is not at a demarcation point as cloud connectivity UNI 125. The private network for connecting to applications may be provided by cloud service provider network 110. As further shown at the bottom of FIG. 1K, a cloud VC provided between cloud subscriber 105 and cloud service provider network 110 may terminate at cloud application interfaces (e.g., cloud application S/UNI-Ss 130).

Figure 1L:
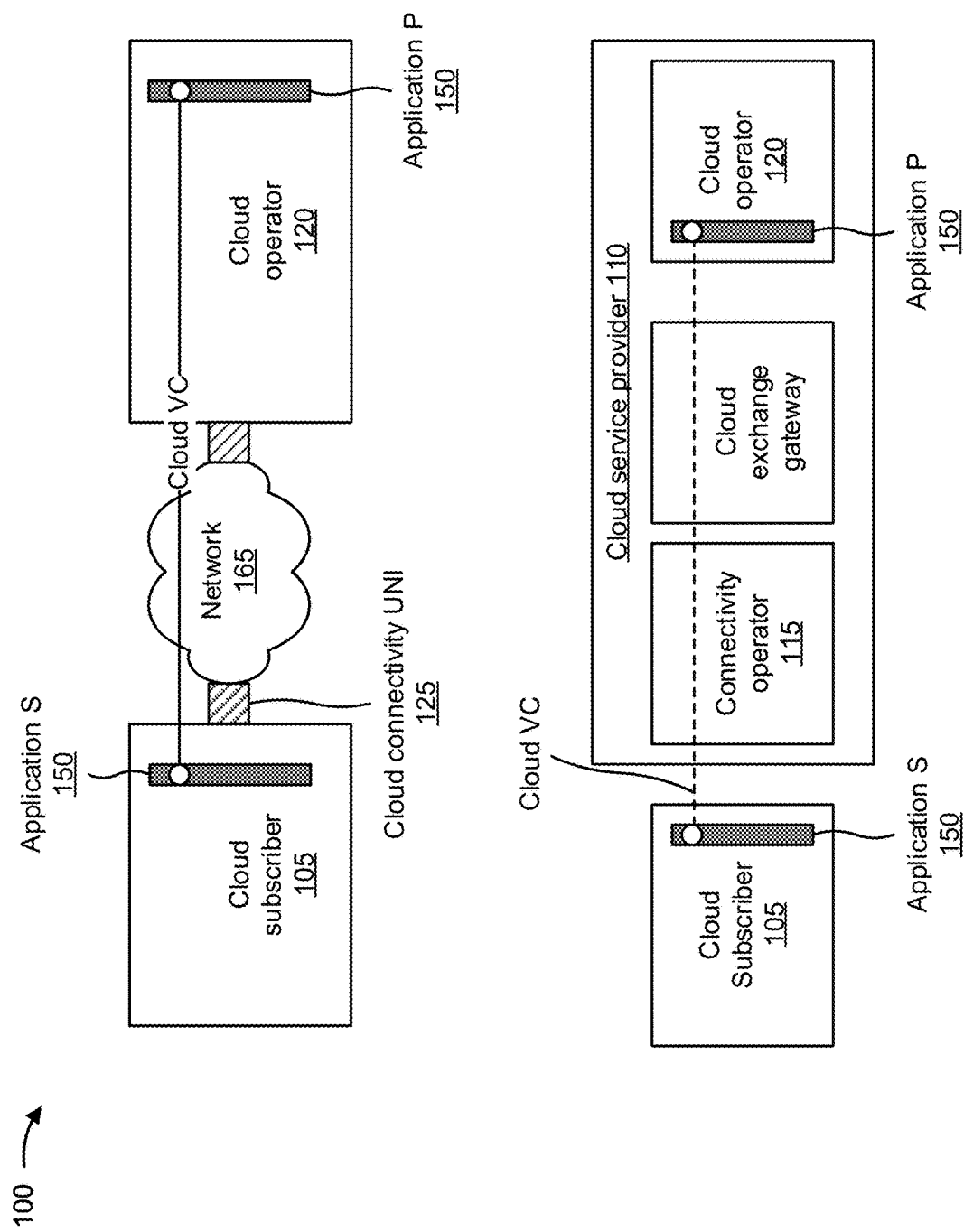

The top of FIG. 1L depicts cloud services provided by cloud operator 120 to cloud subscriber 105 over a network 165 (e.g., the Internet). Physical connectivity to network 165 may be provided by cloud connectivity UNIs 120 (e.g., virtual connections, such as VPN over Internet) and may enable applications P 150 associated with cloud operator 120 to be visible to cloud subscriber 105. Functionalities associated with the connectivity may be distributed over cloud subscriber 105, network 165, and cloud operator 120 via a cloud VC. As further shown at the top of FIG. 1L, the cloud VC provided between cloud subscriber 105 and cloud operator 120 may terminate at application S 150 provided in cloud subscriber 105 and application P provided in cloud operator 120. In one example, cloud subscriber 105 may utilize network 165 access from a local Internet Service Provider (ISP) to connect to application P 150 of cloud operator 120 and may purchase applications 150 from cloud operator 120. When there is a problem with network 165 access, cloud subscriber 105 may resolve the problem with the ISP and cloud operator 120. When there is a problem with applications P 150, cloud subscriber 105 may resolve the problem with cloud operator 120. A role of cloud subscriber 105 may not change whether the access to cloud operator 120 is provided by an ISP or by a private network operator.

As shown at the bottom of FIG. 1L, cloud subscriber 105 may access cloud operator 120 via connectivity operator 115 that is connected to cloud operator 120 via a cloud exchange gateway. The cloud exchange gateway may provide connectivity among multiple parties, such as connectivity operator 115 and cloud operator 120. As further shown at the bottom of FIG. 1L, a cloud VC provided between cloud subscriber 105 and cloud operator 120 may terminate at application S 150 provided in cloud subscriber 105 and application P 150 provided in cloud operator 120.

Figure 1M:
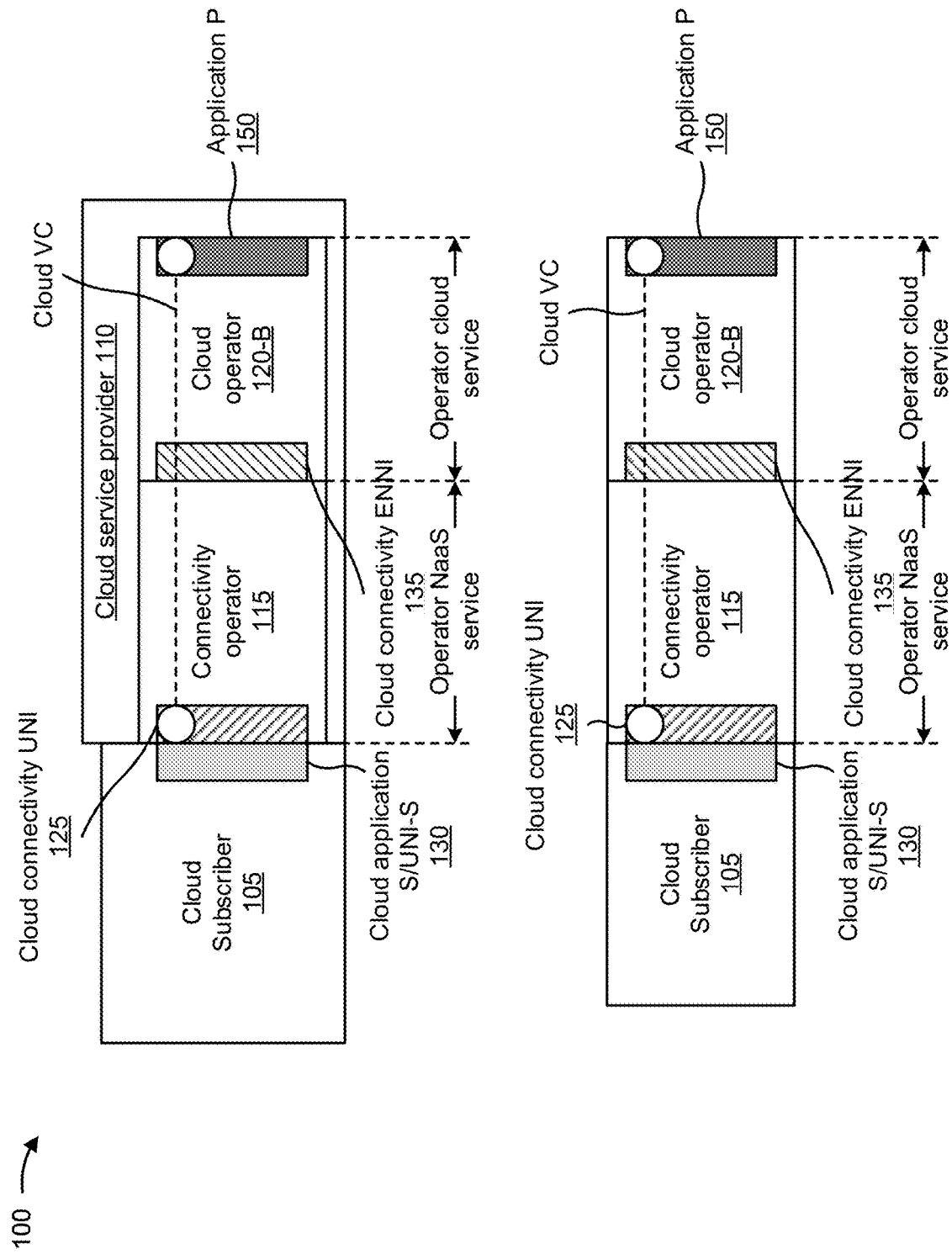

The top of FIG. 1M depicts a cloud service provided to cloud subscriber 105 by cloud service provider network 110. Application P 150 may be provided by cloud operator 120-B, and connectivity to application P 150 may be provided by cloud operator 120-A. Cloud service provider network 110 may provide coordination between connectivity operator 115 and cloud operator 120-B. In some implementations, connectivity operator 115, cloud operator 120-B, or a third party may be a cloud service provider acting as a single point of contact for cloud subscriber 105. A cloud VC provided between cloud subscriber 105 and connectivity operator 115 may terminate at application UNI-S 130 provided in cloud subscriber 105 and applications P 150 provided in cloud operator 120-B.

As further shown at the top of FIG. 1M, cloud connectivity ENNI 135 provided between connectivity operator 115 and cloud operator 120-B may be visible to each of connectivity operator 115 and cloud operator 120-B. However, the service (e.g., including connectivity and/or applications) provided by each of connectivity operator 115 and cloud operator 120-B to cloud service provider network 110 may not be visible to the other cloud operator unless the other cloud operator is the cloud service provider. Furthermore, cloud connectivity UNI 125 for cloud subscriber 105 may be visible to connectivity operator 115.

As further shown at the top of FIG. 1M, connectivity operator 115 may provide connectivity for cloud subscriber 105 to cloud operator 120-B as a network-as-a-service (NaaS). Cloud operator 120-B may provide application P 150 to cloud service provider network 110 as a cloud service, such as a software-as-a-service (SaaS), a platform-as-a-service (PaaS), an infrastructure-as-a-service (IaaS), and/or the like. In some implementations, cloud subscriber 105 may support cloud connectivity UNI 125 or both cloud connectivity UNI 125 and cloud application S/UNI-S 130 at the cloud subscriber interface, which may be provided between cloud subscriber 105 and connectivity operator 115.

As shown at the bottom of FIG. 1M, cloud subscriber 105 may act as a cloud service provider, and cloud service provider network 110 may be omitted. In some implementations, cloud subscriber 105 may arrange separate services with connectivity operator 115 and cloud operator 120-B in order to obtain a desired overall service. For example, cloud subscriber 105 may arrange an NaaS service with connectivity operator 115 and may arrange a cloud service with cloud operator 120-B.

Figure 1N:
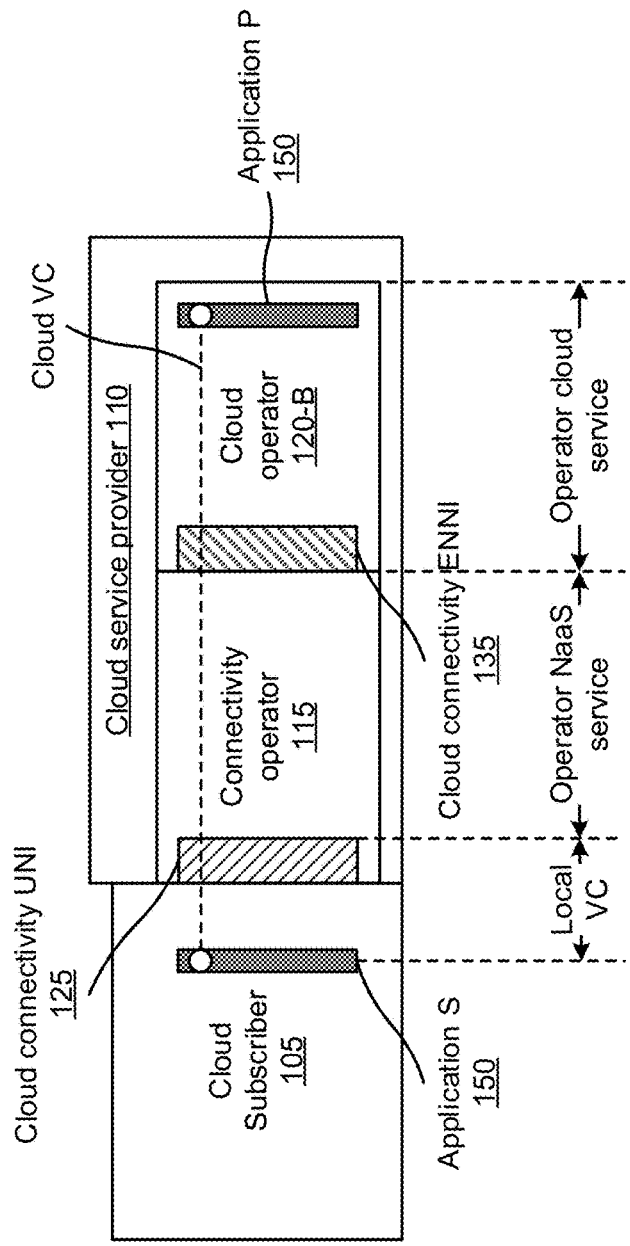
Figure 10:
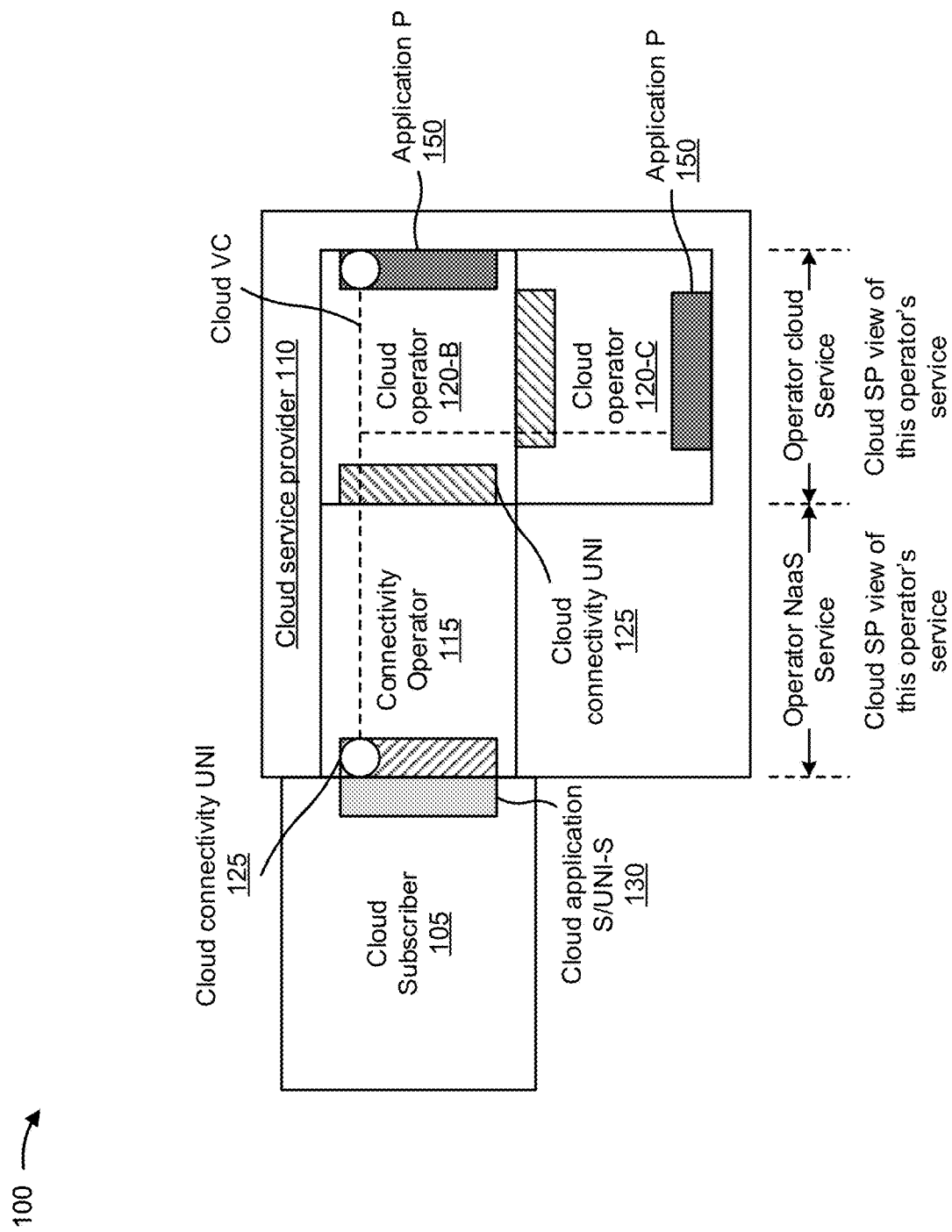

FIG. 1N depicts the configuration shown at the top of FIG. 1M. However, the configuration of FIG. 1N includes a local VC that terminates inside cloud subscriber 105 at application S 150.

As shown in FIG. 1O, a cloud service may be provided by connectivity operator 115 and two cloud operators 120-B and 120-C. Connectivity operator 115 may connect cloud subscriber 105 to cloud operator 120-B. Cloud operator 120-B and cloud operator 120-C may provide applications P 150 and components of a multipoint or a point-to-point cloud VC initiated by cloud subscriber 105. Such a configuration may support various cloud services.

For example, for a VoIP service, cloud operator 120-B may support a session border controller (SBC) application with a virtual SBC (vSBC) VNF, and cloud operator 120-C may support a firewall (FW) application with a virtual FW (vFW) VNF. vSBC and vFW may execute over the multipoint or point-to-point cloud VC. In this configuration, each application may execute separately. vSBC may be considered a communications-as-a-service (CaaS) application and vFW may be considered a security-as-a-service (SECaaS) application. Therefore, in this example, cloud operator 120-A may provide NaaS and cloud operator 120-B may provide CaaS to cloud service provider network 110, and cloud operator 120-C may provide SECaaS to cloud service provider network 110. An end-to-end cloud service provided by cloud service provider network 110 to cloud subscriber 105 may be referred to as a combination of CaaS and SECaaS.

In some implementations, applications P 150 provided by cloud operator 120 may be accessed via the Internet. Given that the Internet provides best-effort service, non-mission critical applications and applications that are less sensitive to network delay, jitter, and/or loss may be more likely to be accessed via the Internet. In some implementations, cloud subscribers 105 may utilize private networks to access mission critical applications and applications that are sensitive to network delay, jitter, and/or loss, and the Internet may be used as a back-up for connectivity.

Implementations described herein may be utilized to provide cloud operator 120 access using the Internet and a private network. For example, an employee (e.g., cloud subscriber 105) of an enterprise may utilize an enterprise network (e.g., a private network) to access cloud operator 120 or may utilize the Internet to directly access cloud operator 120. An interface between the enterprise network and cloud operator 120 may include stricter security capabilities compared to an interface between the Internet and cloud operator 120. In such an example, a branch office of the enterprise, with no access to the enterprise network, may access a virtual router provided by cloud operator 120 via the Internet. Cloud operator 120 may include a gateway to the enterprise network that provides connectivity to the branch office. In some implementations, cloud subscribers 105 may access applications P 150 hosted by multiple cloud operators 120 via the Internet or via a private network.

Applications P 150 and connectivity to applications P 150 can be provided by a single cloud operator 120 (e.g., a telecommunications service provider). A private network of cloud operator 120 may include an L1 network, an L2 network, an L3 network, a wireless network, an SD-WAN, and/or the like. In some implementations, connectivity and applications P 150 may be provided by two different cloud operators 120.

In some implementations, cloud operator 120-A may team up with cloud operator 120-B and offer applications P 150 to cloud subscribers 105 over a private network. Cloud subscribers 105 may only interact with one of cloud operators 120-A and 120-B and may be unaware of the locations of applications P 150. One of cloud operators 120-A and 120-B may manage the private network and may play a role of connectivity operator 115.

In some implementations, establishing a cloud operator interface between two connectivity operators 115, between connectivity operator 115 and cloud operator 120, or between two cloud operators 120 may not always be economically justified. In such cases, a cloud exchange network device (e.g., a gateway) may provide connectivity among such entities. Via the cloud exchange network device, cloud subscribers 105 may be able to move virtualized components (e.g. applications P 150, VNFs, VMs, containers, and/or the like) from one cloud operator 120 to another. Cloud subscribers 105 may place the virtualized components in multiple cloud operators 120 and may establish service function chaining among them.

Implementations described herein may be utilized to provide one or more cloud services. A cloud service may include an end-to-end service with one or more of platform components, such as compute and storage, applications, and connectivity among the aforementioned, that may be accessed by cloud subscriber 105 from one or more locations. A cloud service may include an end-to-end service among cloud subscribers 105, connectivity operators 115, and cloud operators 120 that provides virtual and non-virtual resources. The cloud services may be grouped in a network-as-a-service (NaaS), an infrastructure-as-a-service (IaaS), a platform-as-a-service (PaaS), a software-as-a-service (SaaS), a communications-as-a-service (CaaS), a security-as-a-service (SECaaS), and/or the like categories. Cloud services in a same category may include similar characteristics.

NaaS may deliver assured and dynamic connectivity services via a virtual connection, and via virtual, or both physical and virtual, service endpoints over one or more operator networks. Such services may enable users, applications, and/or systems to create, modify, suspend/resume, and/or terminate connectivity services through standardized application programming interfaces (APIs). Such services may be assured from both performance and security perspectives. NaaS may support connectivity through homogenous or heterogeneous networks by one or more cloud operators 120, where one of cloud operators 120 may act as a cloud service provider; may provide on-demand network configuration capability; may guarantee quality of service (QoS) according to the negotiated service level specifications; and/or may provide connection security that includes encryption. An NaaS provider (e.g., connectivity operator 115 or cloud service provider network 110) may maintain and manage network resources. In some implementations, cloud service provider network 110 may not own the NaaS, but may provide coordination with connectivity operator 115 for the NaaS.

An IaaS may provision processing, storage, networks, and other fundamental computing resources for cloud subscriber 105 so that cloud subscriber 105 may deploy and execute arbitrary software (e.g., operating systems and applications). Cloud subscriber 105 might not manage or control an underlying cloud infrastructure, but may have control over operating systems, storage, deployed applications, and possibly limited control over select networking components (e.g., host firewalls).

A PaaS may enable cloud subscriber 105 to deploy, onto a cloud infrastructure, subscriber-created or acquired applications P 150 created using programming languages and tools supported by cloud operator 120. Cloud subscriber 105 might not manage or control the underlying cloud infrastructure (e.g., a network, servers, operating systems, storage, and/or the like), but may control deployed applications and possibly an application hosting environment. A PaaS may include a standalone development environment that does not include technical, licensing, and/or financial dependencies on specific SaaS applications or web services. A PaaS may include an application delivery-only environment that does not include development, debugging, and/or test capabilities as part of the service. A PaaS may be an open platform-as-a-service that does not include hosting, but rather provides open source software to allow a PaaS provider to execute applications. Some open platforms with an external API may enable a developer to use any programming language, database, operating system, server, and/or the like to deploy applications. With PaaS, a scalable and high-performing network may be formed with a fully-managed application platform for executing and consolidating software applications and databases. A PaaS may be provided via a data center, a cloud-in-a-box, and/or the like. The cloud-in-a-box may be deployed at a customer premises provided by cloud service provider network 110. A VNF owned and maintained by cloud subscriber 105 may execute over the cloud-in-a-box to perform a service function, such as security. The VNF may perform service function chaining with another VNF provided by cloud operator 120 in order to support additional capabilities.

An SaaS may enable cloud subscriber 105 to utilize applications P 150 provided by cloud operator 120 and executing on a cloud infrastructure. Applications P 150 may be accessible to cloud subscriber 105 via a thin client interface (e.g., a web browser, web-based email, and/or the like). Cloud subscriber 105 might not manage or control the underlying cloud infrastructure, such as a network, servers, operating systems, storage, application capabilities, and/or the like.

A CaaS may provide real-time services, such as a virtual private branch exchange (PBX), voice and video conferencing systems, collaboration systems, call centers, local and domestic long distance point-to-point or multipoint voice calling, fixed mobile convergence (e.g., a combination of fixed broadband and local access wireless technologies), voicemail, integrated business communications, point-to-point or multipoint video calling, point-to-point or multipoint video conferencing, professional voice recording services, and/or the like.

In this way, several different stages of the process for supporting separate cloud services may be enhanced with a cloud computing environment that includes split connectivity and application interfaces, which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed. For example, currently there does not exist a technique that supports separate cloud services with a cloud computing environment that includes split connectivity and application interfaces. Finally, the process for supporting separate cloud services conserves computing resources (e.g., processing resources, memory resources, communication resources, and/or the like), networking resources, and/or the like that would otherwise be wasted attempting to provide the cloud services without the split connectivity and application interfaces.

As indicated above, FIGS. 1A-1O are provided merely as examples. Other examples may differ from what is described with regard to FIGS. 1A-1O. The number and arrangement of devices and networks shown in FIGS. 1A-1O are provided as an example. In practice, there may be additional devices and/or networks, fewer devices and/or networks, different devices and/or networks, or differently arranged devices and/or networks than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) of FIGS. 1A-1O may perform one or more functions described as being performed by another set of devices of FIGS. 1A-1O.

Figure 2:
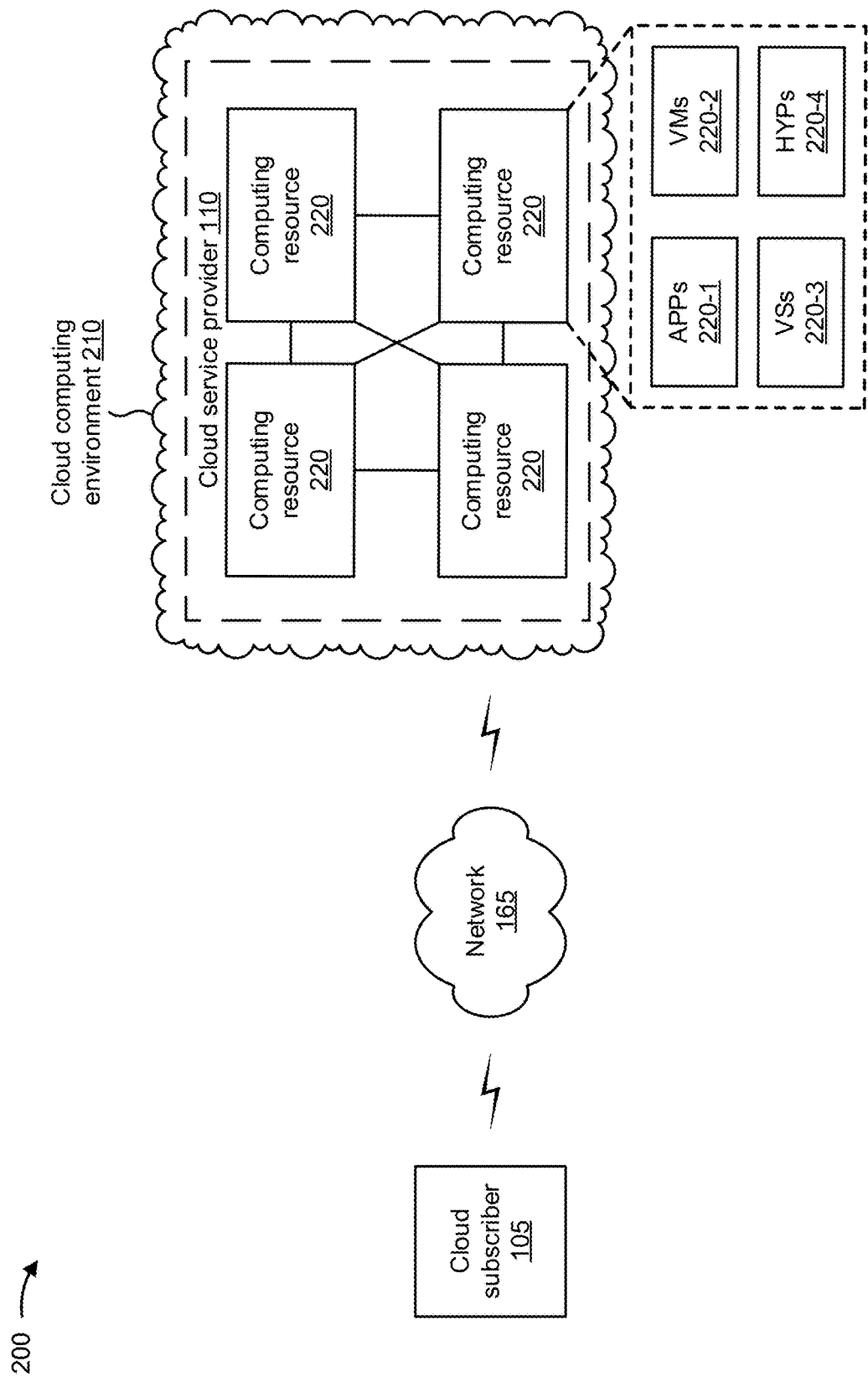
FIG. 2 is a diagram of an example environment in which systems and/or methods described herein may be implemented. The environment includes compute, storage and networking resources.

FIG. 2 is a diagram of an example environment 200 in which systems and/or methods described herein may be implemented. As shown in FIG. 2, environment 200 may include cloud subscriber 105, cloud service provider network 110, and network 165. Devices of environment 200 may interconnect via wired connections, wireless connections, or a combination of wired and wireless connections.

Cloud subscriber 105 includes one or more devices capable of receiving, generating, storing, processing, and/or providing information, such as information described herein. For example, cloud subscriber 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, cloud subscriber 105 may receive information from and/or transmit information to cloud service provider network 110.

Cloud service provider network 110 includes one or more devices that support separate cloud services with a cloud computing environment that includes split connectivity and application interfaces. In some implementations, cloud service provider network 110 may be designed to be modular such that certain software components may be swapped in or out depending on a particular need. As such, cloud service provider network 110 may be easily and/or quickly reconfigured for different uses. In some implementations, cloud service provider network 110 may receive information from and/or transmit information to one or more cloud subscribers 105.

In some implementations, as shown, cloud service provider network 110 may be hosted in a cloud computing environment 210. Notably, while implementations described herein describe cloud service provider network 110 as being hosted in cloud computing environment 210, in some implementations, cloud service provider network 110 may not be cloud-based (i.e., may be implemented outside of a cloud computing environment) or may be partially cloud-based.

Cloud computing environment 210 includes an environment that hosts cloud service provider network 110. Cloud computing environment 210 may provide computation, software, data access, storage, etc., services that do not require end-user knowledge of a physical location and configuration of system(s) and/or device(s) that hosts cloud service provider network 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host cloud service provider network 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections. In some implementations, one or more computing resources 220 may correspond to one or more connectivity operators 115, one or more cloud operators 120, and/or the like. For example, connectivity operator 115 and/or cloud operator 120 may provide the functionalities described herein via one or more computing resources 220.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client devices associated with cloud computing environment 210. Application 220-1 may eliminate a need to install and execute the software applications on client devices. For example, application 220-1 may include software associated with cloud service provider network 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine, and may include a one or more containers. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of a client device or an operator of cloud service provider network 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 165 includes one or more wired and/or wireless networks. For example, network 165 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

In some implementations, network 165 may include one or more network devices. A network device includes one or more devices (e.g., one or more traffic transfer devices)

capable of receiving, providing, storing, generating, and/or processing information described herein. For example, the network device may include a firewall, a router, a policy enforcer, a gateway, a switch, a hub, a bridge, a reverse proxy, a server (e.g., a proxy server), a security device, an intrusion detection device, a load balancer, or a similar device. In some implementations, the network device may receive information from and/or provide information to one or more other devices of environment 200. In some implementations, the network device may be a physical device implemented within a housing, such as a chassis. In some implementations, the network device may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
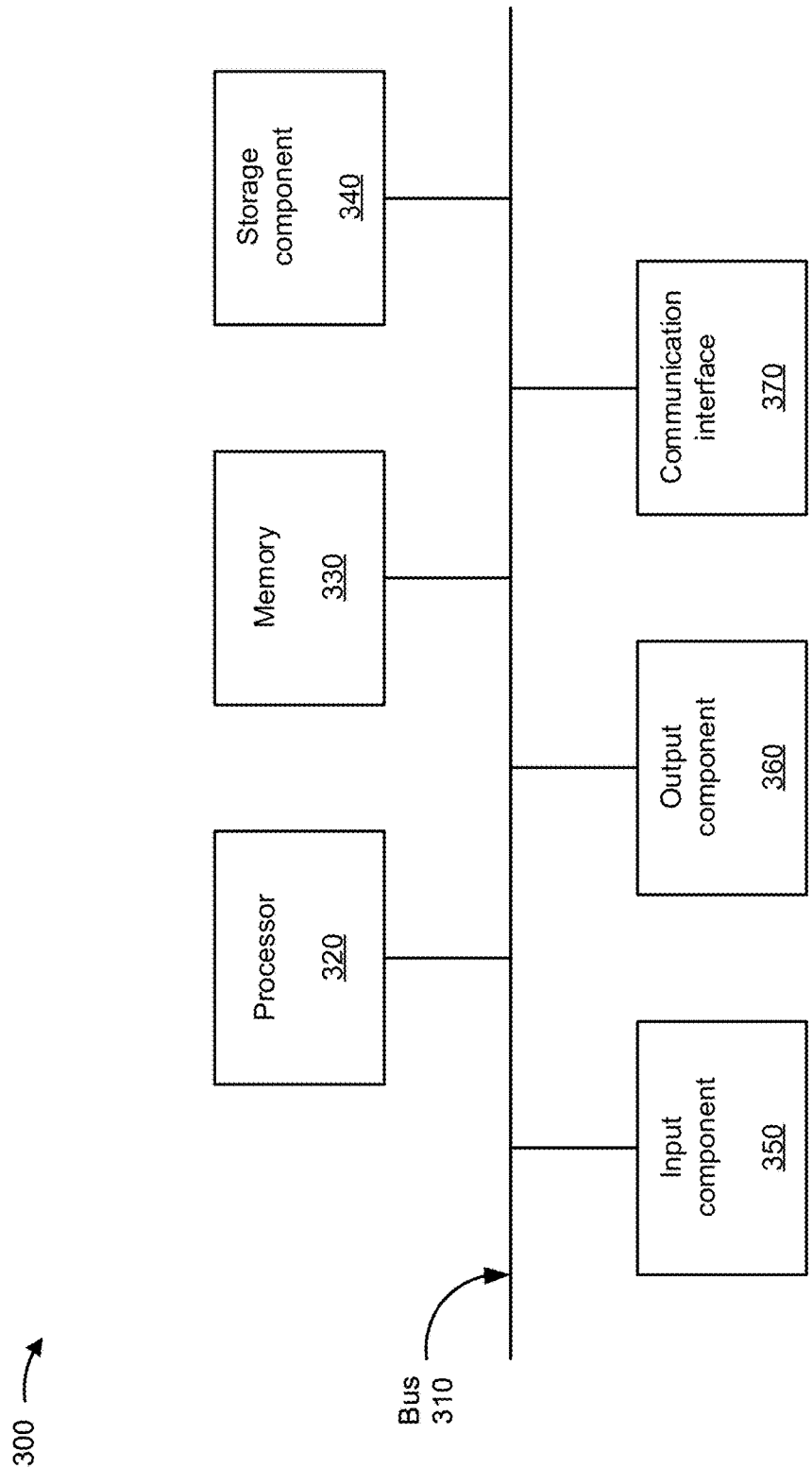
FIG. 3 is a diagram of example components of one or more devices of FIG. 2.

FIG. 3 is a diagram of example components of a device 300. Device 300 may correspond to cloud subscriber 105, cloud service provider network 110, and/or computing resource 220. In some implementations, cloud subscriber 105, cloud service provider network 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
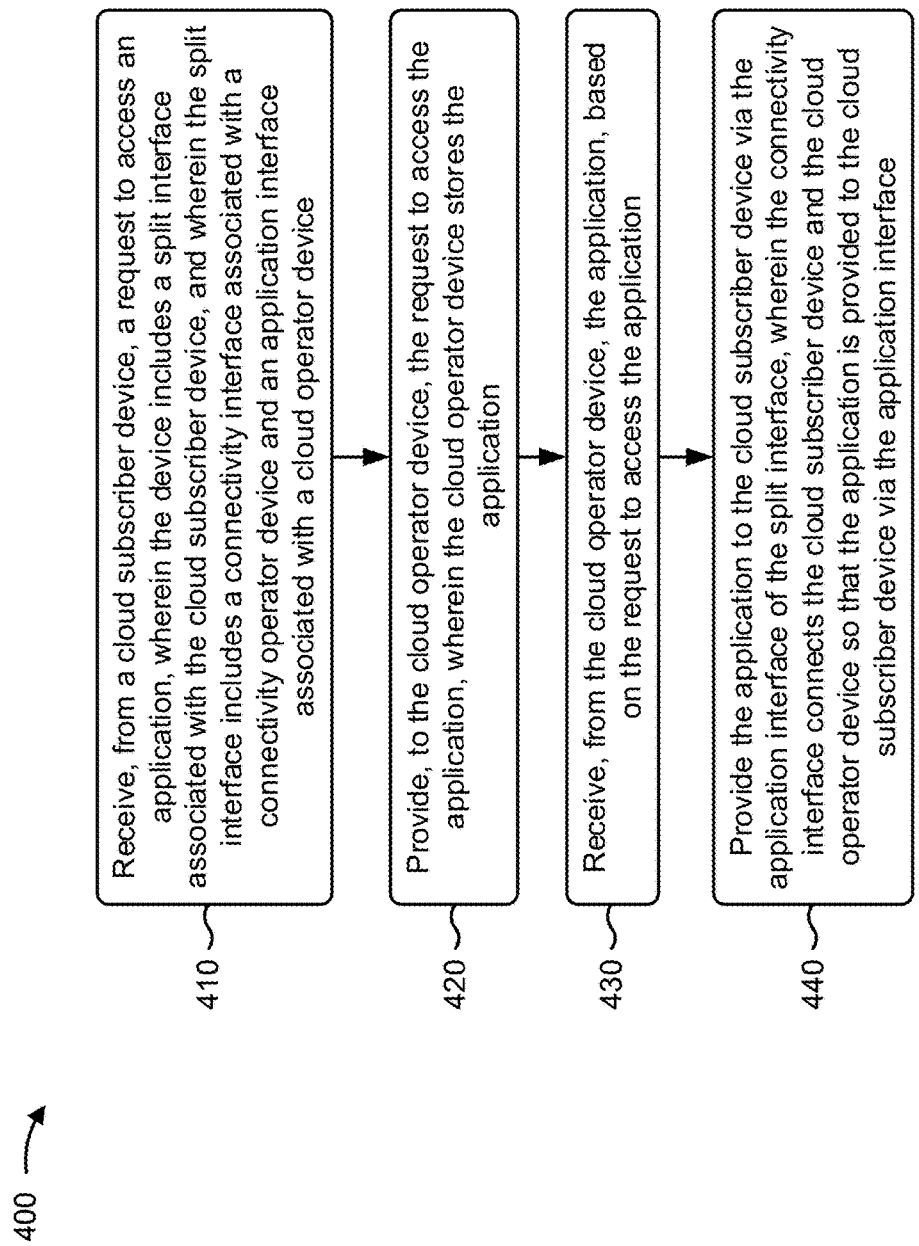
FIG. 4 is a flow chart of an example process for supporting separate cloud services with a cloud computing environment that includes split connectivity and application interfaces.

FIG. 4 is a flow chart of an example process 400 for supporting separate cloud services with a cloud computing environment that includes split connectivity and application interfaces. In some implementations, one or more process blocks of FIG. 4 may be performed by a cloud service provider network (e.g., cloud service provider network 110). In some implementations, one or more process blocks of FIG. 4 may be performed by another device or a group of devices separate from or including the cloud service provider network, such as a cloud subscriber (e.g., cloud subscriber 105), a connectivity operator (e.g., connectivity operator 115), and/or a cloud operator (e.g., cloud operator 120).

As shown in FIG. 4, process 400 may include receiving, from a cloud subscriber device, a request to access an application, wherein the cloud service provider network includes a split interface associated with the cloud subscriber device, and wherein the split interface includes a connectivity interface associated with a connectivity operator device and an application interface associated with a cloud operator device (block 410). For example, the cloud service provider network (e.g., using computing resource 220, processor 320, communication interface 370, and/or the like) may receive, from a cloud subscriber device, a request to access an application, as described above. In some implementations, the cloud service provider network may include a split interface associated with the cloud subscriber device. In some implementations, the split interface may include a connectivity interface associated with a connectivity operator device, and an application interface associated with a cloud operator device.

As further shown in FIG. 4, process 400 may include providing, to the cloud operator device, the request to access the application, wherein the cloud operator device stores the application (block 420). For example, the cloud service provider network (e.g., using computing resource 220, processor 320, memory 330, communication interface 370, and/or the like) may provide, to the cloud operator device, the request to access the application, as described above. In some implementations, the cloud operator device may store the application.

As further shown in FIG. 4, process 400 may include receiving, from the cloud operator device, the application, based on the request to access the application (block 430). For example, the cloud service provider network (e.g., using computing resource 220, processor 320, storage component 340, communication interface 370, and/or the like) may receive, from the cloud operator device, the application, based on the request to access the application, as described above.

As further shown in FIG. 4, process 400 may include providing the application to the cloud subscriber device via the application interface of the split interface, wherein the connectivity interface connects the cloud subscriber device and the cloud operator device so that the application is provided to the cloud subscriber device via the application interface (block 440). For example, the cloud service provider network (e.g., using computing resource 220, processor 320, output component 360, communication interface 370, and/or the like) may provide the application to the cloud subscriber device via the application interface of the split interface, as described above. In some implementations, the connectivity interface may connect the cloud subscriber device and the cloud operator device so that the application is provided to the cloud subscriber device via the application interface.

Process 400 may include additional implementations, such as any single implementation or any combination of implementations described below and/or in connection with one or more other processes described elsewhere herein.

In a first implementation, the connectivity interface may support a physical layer protocol, a data link layer protocol, and a network layer protocol in a data plane, a control plane, and a management plane; and the application interface may support the data link layer protocol, the network layer protocol, a transport layer protocol, a session layer protocol, a presentation layer protocol, and an application layer protocol in the data plane, the control plane, and the management plane.

In a second implementation, alone or in combination with the first implementation, the connectivity interface may include one of a user-to-network interface (UNI) or an external network-to-network interface (ENNI), and the application interface may include one of the UNI or the ENNI.

In a third implementation, alone or in combination with one or more of the first and second implementations, the cloud service provider network may cause a cloud service to be provided to the cloud subscriber device. In some implementations, the cloud service may be provided by another cloud operator device.

In a fourth implementation, alone or in combination with one or more of the first through third implementations, the cloud service may include one or more of network-as-a-service, infrastructure-as-a-service, platform-as-a-service, software-as-a-service, communications-as-a-service, or security-as-a-service.

In a fifth implementation, alone or in combination with one or more of the first through fourth implementations, the other cloud operator device may communicate with the cloud operator device via another split interface that includes another connectivity interface and another application interface.

In a sixth implementation, alone or in combination with one or more of the first through fifth implementations, the application interface may connect a virtual network function, a virtual machine, and/or a container, provided by the cloud subscriber device, with the application via a cloud virtual connection.

In a seventh implementation, alone or in combination with one or more of the first through sixth implementations, the cloud subscriber device may access the cloud service provider network via a private network and the connectivity interface.

In an eighth implementation, alone or in combination with one or more of the first through sixth implementations, the cloud subscriber device may access the cloud service provider network via a public network and the connectivity interface.

In a ninth implementation, alone or in combination with one or more of the first through eighth implementations, the connectivity operator device may connect with the cloud operator device and may enable connectivity of the cloud subscriber device to the cloud operator device.

In a tenth implementation, alone or in combination with one or more of the first through ninth implementations, the split interface may include a bi-directional link that provides traffic, control plane, and management capabilities required by the cloud service provider network and dedicated to the cloud subscriber device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a cloud subscriber device, a request to access an application,
      wherein the device includes a split interface associated with the cloud subscriber device,
         wherein the split interface includes:
            a connectivity interface associated with a connectivity operator device, and
            an application interface associated with a cloud operator device, wherein the application interface is operated by the cloud subscriber device;
   providing, by the device and to the cloud operator device, the request to access the application,
      wherein the cloud operator device stores the application;
   receiving, by the device and from the cloud operator device, the application based on the request to access the application; and
   providing, by the device, the application to the cloud subscriber device via the application interface of the split interface,
      wherein:
         the connectivity interface connects the cloud subscriber device and the cloud operator device, and
         the application tunnels through to the cloud subscriber device via the application interface.

2. The method of claim 1, wherein:
   the connectivity interface supports a physical layer protocol, a data link layer protocol, and a network layer protocol in a data plane, a control plane, and a management plane; and
   the application interface supports the data link layer protocol, the network layer protocol, a transport layer protocol, a session layer protocol, a presentation layer protocol, and an application layer protocol in the data plane, the control plane, and the management plane.

3. The method of claim 1, wherein:
   the connectivity interface includes one of a user-to-network interface (UNI) or an external network-to-network interface (ENNI); and
   the application interface includes one of the UNI or the ENNI.

4. The method of claim 1, further comprising:
   causing a cloud service to be provided to the cloud subscriber device,
      wherein the cloud service is provided by another cloud operator device.

5. The method of claim 4, wherein the cloud service includes one or more of:
   network-as-a-service,
   infrastructure-as-a-service,
   a platform-as-a-service,
   software-as-a-service,
   communications-as-a-service, or
   security-as-a-service.

6. The method of claim 4, wherein the other cloud operator device communicates with the cloud operator device via another split interface that includes:
   another connectivity interface, and
   another application interface.

7. The method of claim 1, wherein the application interface connects a virtual network function, provided by the cloud subscriber device, with the application via a cloud virtual connection.

8. A device, comprising:
   one or more memories; and
   one or more processors, coupled to the one or more memories, configured to:
      receive, from a cloud subscriber device, a request to access an application,
         wherein the device includes a split interface associated with the cloud subscriber device,
            wherein the split interface includes:
               a connectivity interface associated with a connectivity operator device, and
               an application interface associated with a cloud operator device,
               wherein the connectivity interface includes one of a user-to-network interface (UNI) or an external network-to-network interface (ENNI),
               wherein the application interface includes one of the UNI or the ENNI, and
               wherein the application interface is operated by the cloud subscriber device;
      provide, to the cloud operator device, the request to access the application,
         wherein the cloud operator device stores the application;
      receive, from the cloud operator device, the application based on the request to access the application; and
      provide the application to the cloud subscriber device via the application interface of the split interface,
         wherein:
            the connectivity interface connects the cloud subscriber device and the cloud operator device, and
            the application tunnels through to the cloud subscriber device via the application interface.

9. The device of claim 8, wherein the application interface connects a virtual machine, provided by the cloud subscriber device, with the application via a cloud virtual connection.

10. The device of claim 8, wherein the application interface connects a container, provided by the cloud subscriber device, with the application via a cloud virtual connection.

11. The device of claim 8, wherein the cloud subscriber device accesses the device via a private network and the connectivity interface.

12. The device of claim 8, wherein the cloud subscriber device accesses the device via a public network and the connectivity interface.

13. The device of claim 8, wherein the connectivity operator device connects with the cloud operator device and enables connectivity of the cloud subscriber device to the cloud operator device.

14. The device of claim 8, wherein the split interface includes a bi-directional link that provides traffic, control plane, and management capabilities required by the device and dedicated to the cloud subscriber device.

15. A non-transitory computer-readable medium storing instructions, the instructions comprising:
   one or more instructions that, when executed by one or more processors of a device, cause the one or more processors to:
      receive, from a cloud subscriber device, a request to access an application,
         wherein the device includes a split interface associated with the cloud subscriber device,
         wherein the split interface includes:
            a connectivity interface associated with a connectivity operator device, and
            an application interface associated with a cloud operator device,
            wherein the application interface is operated by the cloud subscriber device;
      provide, to the cloud operator device, the request to access the application,
         wherein the cloud operator device stores the application;
      receive, from the cloud operator device, the application based on the request to access the application;
      provide the application to the cloud subscriber device via the application interface of the split interface,
         wherein:
            the connectivity interface connects the cloud subscriber device and the cloud operator device, and
            the application tunnels through to the cloud subscriber device via the application interface; and
      cause a cloud service to be provided to the cloud subscriber device,
         wherein the cloud service is provided by another cloud operator device.

16. The non-transitory computer-readable medium of claim 15, wherein:
   the connectivity interface supports a physical layer protocol, a data link layer protocol, and a network layer protocol in a data plane, a control plane, and a management plane; and
   the application interface supports the data link layer protocol, the network layer protocol, a transport layer protocol, a session layer protocol, a presentation layer protocol, and an application layer protocol in the data plane, the control plane, and the management plane.

17. The non-transitory computer-readable medium of claim 15, wherein the cloud service includes one or more of:
   network-as-a-service,
   infrastructure-as-a-service,
   a platform-as-a-service,
   software-as-a-service,
   communications-as-a-service, or
   security-as-a-service.

18. The non-transitory computer-readable medium of claim 15, wherein the other cloud operator device communicates with the cloud operator device via another split interface that includes:
   another connectivity interface, and
   another application interface.

19. The non-transitory computer-readable medium of claim 15, wherein the application interface connects one or more of a virtual network function, a virtual machine, or a container, provided by the cloud subscriber device, with the application via a cloud virtual connection.

20. The non-transitory computer-readable medium of claim 15, wherein the split interface includes a bi-directional link that provides traffic, control plane, and management capabilities required by the device and dedicated to the cloud subscriber device.

* * * * *